United States Patent
Na et al.

(10) Patent No.: US 10,149,107 B2
(45) Date of Patent: Dec. 4, 2018

(54) METHOD AND APPARATUS FOR ESTIMATING POSITION OF TERMINAL

(71) Applicant: Samsung Electronics Co., Ltd., Suwon-si, Gyeonggi-do (KR)

(72) Inventors: In-Hak Na, Yongin-si (KR); Sang-Jun Moon, Yongin-si (KR); Sin-Seok Seo, Seongnam-si (KR); Sang-Hyun Chang, Seoul (KR); Dae-Kyu Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/341,613

(22) Filed: Nov. 2, 2016

(65) Prior Publication Data

US 2017/0195855 A1 Jul. 6, 2017

(30) Foreign Application Priority Data

Jan. 5, 2016 (KR) ........................ 10-2016-0001119

(51) Int. Cl.
*H04W 64/00* (2009.01)
*H04W 4/02* (2018.01)
*G01C 5/06* (2006.01)
*G01C 9/00* (2006.01)
*H04L 29/08* (2006.01)
*G01S 5/02* (2010.01)
(Continued)

(52) U.S. Cl.
CPC ............. *H04W 4/028* (2013.01); *G01C 5/06* (2013.01); *G01C 9/00* (2013.01); *G01S 5/0252* (2013.01); *H04L 67/12* (2013.01); *H04W 4/029* (2018.02); *H04W 4/70* (2018.02)

(58) Field of Classification Search
CPC ............. H04W 64/00; H04W 56/0045; H04W 56/005; H04W 88/08; H04W 64/003; H04W 4/22; H04W 56/006; H04W 4/021
See application file for complete search history.

(56) References Cited

U.S. PATENT DOCUMENTS

| 7,292,865 | B2 | 11/2007 | Contractor |
| 8,576,122 | B2 | 11/2013 | Choi |
| 8,750,823 | B2 | 6/2014 | Johnson |

(Continued)

FOREIGN PATENT DOCUMENTS

| KR | 10-2013-0132659 A | 12/2013 |
| WO | 2015/093644 A1 | 6/2015 |

*Primary Examiner* — Quan M Hua
(74) *Attorney, Agent, or Firm* — Jefferson IP Law, LLP

(57) ABSTRACT

A method and apparatus for estimating a position of a terminal is provided. The method and apparatus include a technique for a sensor network, a machine to machine (M2M), a machine type communication (MTC), and Internet of things (IoT), and may be used for intelligent services based on the technique (smart homes, smart buildings, smart cities, smart cars or connected cars, healthcare, digital education, retail industry, and security and safety related services). The method includes identifying direction information of a received signal if setting up connection between a terminal and an access point (AP), receiving information about a barometric pressure sensor from the terminal, and calculating the position of the terminal based on the direction information and the information about the barometric pressure sensor of the terminal.

4 Claims, 25 Drawing Sheets

(51) Int. Cl.
*H04W 4/029* (2018.01)
*H04W 4/70* (2018.01)

(56) References Cited

U.S. PATENT DOCUMENTS

| | | |
|---|---|---|
| 2004/0258012 A1* | 12/2004 | Ishii ............... H04L 47/10 |
| | | 370/328 |
| 2007/0001897 A1 | 1/2007 | Alland |
| 2007/0031151 A1 | 2/2007 | Cunningham et al. |
| 2008/0139114 A1* | 6/2008 | Ranganathan ....... H04B 5/0062 |
| | | 455/41.1 |
| 2009/0326120 A1 | 12/2009 | Kawagoshi et al. |
| 2012/0013475 A1* | 1/2012 | Farley .................. G01S 5/0045 |
| | | 340/665 |
| 2012/0158297 A1 | 6/2012 | Kim et al. |
| 2012/0252495 A1 | 10/2012 | Moeglein et al. |
| 2012/0299776 A1 | 11/2012 | Lee et al. |
| 2013/0030931 A1 | 1/2013 | Moshfeghi |
| 2014/0213299 A1 | 7/2014 | Marti et al. |
| 2014/0274164 A1 | 9/2014 | Hatakeyama |

* cited by examiner

| Preamble (110) | Signal Field | Service Field | Data Field (MAC Header + Payload) | Tail & Padding |
|---|---|---|---|---|
| 16us | 4us | 16bit | Variable(~5ms) | |

FIG.1A

| Preamble (112) | Access Address | Packet Data Unit (PDU) | CRC |
|---|---|---|---|
| 1Byte | 4Byte | Variable(8~39Byte) | 3Byte |

FIG.1B

| STF (122) | CEF (124) | Header | Payload |
|---|---|---|---|

FIG.1C

METHOD AND APPARATUS FOR ESTIMATING POSITION OF TERMINAL

CROSS-REFERENCE TO RELATED APPLICATION(S)

This application claims the benefit under 35 U.S.C. § 119(a) of a Korean patent application filed on Jan. 5, 2016 in the Korean Intellectual Property Office and assigned Serial number 10-2016-0001119, the entire disclosure of which is hereby incorporated by reference.

TECHNICAL FIELD

The present disclosure relates to a method and an apparatus for estimating a position of a terminal. More particularly, the present disclosure relates to a method for accurately estimating a position or direction of a terminal in a manner to minimize installation costs.

BACKGROUND

The Internet, which is a human-oriented connectivity network where humans generate and consume information, is now evolving to the Internet of things (IoT) where distributed entities, such as things, exchange and process information. The Internet of everything (IoE) has also emerged, which is a combination of the IoT technology and the big data processing technology through connection with a cloud server. As technology elements, such as detection technology, wired/wireless communication and network infrastructure, service interface technology, and security technology, have been demanded for IoT implementation, a sensor network, a machine to machine (M2M), machine type communication (MTC), and so forth have been recently researched for connection between things.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances, advanced medical services, and so forth through convergence and combination between existing information technology (IT) and various industries.

Meanwhile, various position-based services using position information of terminals have been provided. Position estimation in an indoor environment may be used in various aspects, such as recognition of a position of a terminal and path guidance in a large building or shopping mall, position guidance to a parked vehicle in a large parking lot, and saving of a life isolated in a large building in the case of a disaster, such as a fire or an earthquake. Although a position estimation method using a global positioning system (GPS) is generally used, a GPS receiver may not stably receive a GPS satellite signal in indoor environments.

To alleviate a mobile communication load in indoor environments, a position estimation method using multiple already-installed wireless local area networks (WLANs) has attracted much attention. However, when the WLANs are used, wireless signals undergo attenuation, reflection, diffraction, and so forth due to walls, obstacles, and persons in indoor spaces, resulting in a position estimate of a terminal including a large error value.

Therefore, a need exists for a method and an apparatus for estimating a position or direction of a terminal in a manner to minimize installation costs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for accurately estimating a position of a terminal.

Another aspect of the present disclosure is to provide a method and an apparatus for accurately estimating a direction of a terminal.

Another aspect of the present disclosure is to provide a method and an apparatus for estimating a position or direction of a terminal in a manner to minimize installation costs.

Another aspect of the present disclosure is to provide a real-time positioning method and apparatus.

Another aspect of the present disclosure is to provide a method and an apparatus for correcting a position of a terminal by using sensor information.

In accordance with an aspect of the present disclosure, a method for estimating a position of a terminal by an access point (AP) is provided. The method includes identifying direction information of a received signal when setting up connection between a terminal and the AP, receiving information about a barometric pressure sensor from the terminal, and calculating the position of the terminal based on the direction information and the information about the barometric pressure sensor of the terminal.

In accordance with another aspect of the present disclosure, an apparatus for estimating a position of a terminal by an AP is provided. The apparatus includes a transceiver configured to transmit and receive signals and a controller configured to identify direction information of a received signal when connection is set up between a terminal and the AP, receive information about a barometric pressure sensor from the terminal, and calculate the position of the terminal based on the direction information and the information about the barometric pressure sensor of the terminal.

In accordance with another aspect of the present disclosure, a method for estimating a position of a terminal by the terminal is provided. The method includes receiving a beacon signal, extracting the information about the barometric pressure sensor of the terminal in response to the beacon signal, and transmitting the information about the barometric pressure sensor of the terminal, in which the position of the terminal is determined based on direction information of the terminal and the information about the barometric pressure sensor.

In accordance with another aspect of the present disclosure, an apparatus for estimating a position of a terminal by the terminal is provided. The apparatus includes a receiver configured to receive a beacon signal, a controller configured to extract the information about the barometric pressure sensor of the terminal in response to the beacon signal, and a transmitter configured to transmit the information about the barometric pressure sensor of the terminal, in which the position of the terminal is determined based on direction information of the terminal and the information about the barometric pressure sensor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A to 1C are structural diagrams of packets based on a wireless local area network (WLAN) according to an embodiment of the present disclosure;

Throughout the drawings, like reference numerals will be understood to refer to like parts, components, and structures.

DETAILED DESCRIPTION

Figure 2:
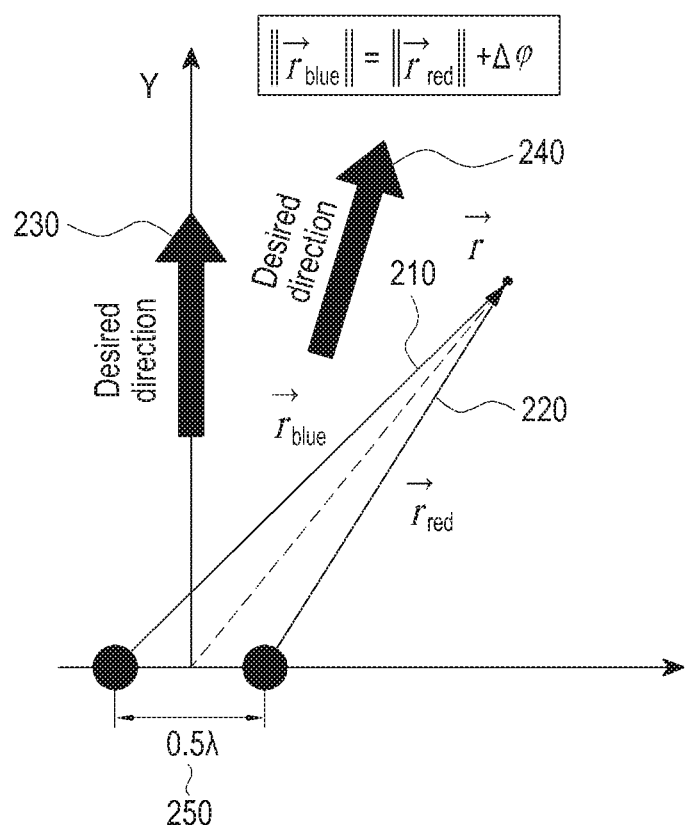
FIG. 2 is a diagram illustrating a method for calculating a direction of arrival (DOA) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms used in the various embodiments of the present disclosure are for the purpose of describing particular embodiments only and are not intended to be limiting. As used herein, the singular forms are intended to include the plural forms as well, unless the context clearly indicates otherwise. The term "include" or "may include" used in the various embodiments of the present disclosure indicates the presence of disclosed corresponding functions, operations, elements, and the like, and does not limit additional one or more functions, operations, elements, and the like. In addition, it should be understood that the term "include" or "has" used in the various embodiments of the present disclosure is to indicate the presence of features, numbers, operations, elements, parts, or a combination thereof described in the specifications, and does not preclude the presence or addition of one or more other features, numbers, operations, elements, parts, or a combination thereof.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various embodiments.

The description that follows includes systems, methods, techniques, instruction sequences, and computer program products that embody techniques of the present inventive subject matter. However, it is understood that the described embodiments may be practiced without a detailed description of these specific details. For example, the embodiments are related to using wireless local area network (WLAN) techniques between an access point (AP) and a terminal, but detailed examples are not limited thereto. In other implementations, other proper communication standards and techniques (e.g., cellular communication) may be used.

An AP to be described below refers to a mutual connection point between a wireless communication network and a terminal and may include a base station or a relay station. In an embodiment of the present disclosure, the AP estimates a position of the terminal. Herein, the wireless communication network may include a $3^{rd}$-generation (3G), $4^{th}$-Generation (4G), Wi-Fi, Bluetooth (BT), near field communication (NFC), and ultra-wideband (UWB). The terminal and the AP may include directional antennas.

The terminal is an entity that connects with the AP by using wireless communication, such as, for example, a user equipment (UE), a mobile station (MS), a cellular phone, a smartphone, a computer, a multimedia system capable of performing a communication function, and the like.

Although it is described in an embodiment of the present disclosure to be described below that an angle φ between coordinates at which the AP is perpendicular to a plane and coordinates at which a terminal and the AP meet each other is identified using an angle of arrival (AoA), the angle φ may be identified using other methods for measuring an angle between a terminal and an AP as well as AoA.

Hereinbelow, the angle φ between the coordinates at which the AP is perpendicular to the plane and the coordinates at which the terminal and the AP meet each other will be referred to as "information about the angle between the terminal and the AP" (or angle information between the terminal and the AP).

In addition, an angle φ between the coordinates at which the AP is perpendicular to the plane and coordinates at which a tag and the AP meet each other will be referred to as "information about the angle between the tag and the AP" (or angle information between the tag and the AP).

The expression "detection" provided below may mean that information is obtained using a detection technique.

A digital media device to be described below refers to a device for providing a media, such as a digital signage. The digital media device will be referred to as a digital signage. The digital signage refers to a device for delivering information, entertainment, advertisements, and so forth with a network-remote-controlled displayer installed in public places and commercial spaces. The digital signage is an information technology (IT)-based implementation of paper or poster-based information delivery to publics, and is referred to as a fourth screen media following a television (TV), a personal computer (PC), and a cellular phone. The digital signage may be installed in various spaces, such as an outer wall of a building, an electric bulletin board, a department store, an inner wall of a large shopping mall, a subway, a terminal, a bus stop, a movie theater, a restaurant, a library, a shop, a hospital, a hotel, an airport, a public office, and the like. The digital signage may provide information to a terminal and may also exchange information with the terminal.

A digital device described below refers to a terminal direct-connected with a server.

According to AoA described below, one AP measures a direction of a signal transmitted from the terminal to determine direction angle information and estimates a position of the terminal by using the determined direction angle information.

FIGS. 1A to 1C are structural diagrams of packets based on a WLAN according to an embodiment of the present disclosure.

FIG. 1A is a structural diagram of a Wi-Fi packet.

Referring to FIG. 1A, a Wi-Fi packet 100 may include a preamble 110, a signal field, a service field, a data field, and a tail and padding field. By using the preamble 110 of 16 μsec at the forefront of the Wi-Fi packet 100, a gain and a phase of a phased array antenna are controlled depending on a direction of a received packet. A direction angle may be determined using the gain and phase obtained during the preamble 110. The signal field, the service field, the data field, and the tail and padding field are not closely related to the present disclosure, and thus will not be described in detail.

FIG. 1B is a structural diagram of a format of a physical layer (PHY) frame to be used as a beacon of 802.11ad.

A PHY frame 130 may include a preamble 112, an access address, a packet data unit (PDU), a cyclic redundancy check (CRC), and so forth. Like in FIG. 1A, by using the preamble 112 of 1 byte at the forefront of the PHY frame 130, a gain and a phase of a phased array antenna are controlled depending on a direction of a received packet. A direction angle may be determined using the gain and phase obtained during the preamble 112.

FIG. 1C is a structural diagram of a beacon frame based on BT low energy (BLE).

The BLE is a low-energy, low-cost wireless communication technology in which a terminal located in a short range recognizes a beacon by using a BT signal and various information is provided to the terminal or information is received from the terminal in a beacon-installed place.

A BLE-based beacon frame 120 may include a short training field (STF) 122, a channel estimation field (CEF) 124, a header, and a payload.

The STF 122 is used for synchronization, and includes repetition of a one-type Golay sequence block.

The CEF 124 is used for channel estimation, and includes a combination of two-type Golay sequences.

The CEF 124 is a key part for calculation of a direction angle and a distance of a line-of-sight (LOS) path.

The header includes transmitter device identification (ID) information.

A description will now be made of a method for estimating a direction angle.

Among algorithms for estimating a direction angle, a spectral algorithm estimates, as an incident direction of a signal, a direction angle with a maximum value in a spectrum having an incident direction as a variable. Depending on a method for defining a spectrum and detecting a maximum point, the algorithms are classified into a beamforming algorithm and a subspace algorithm.

The beamforming algorithm is one of the most basic direction angle estimation methods using an array antenna. The array antenna is directed in all directions, and a spatial spectrum is formed by output values, thus determining a position indicating a maximum value as an incident direction of a signal. An output of the array antenna includes a linear combination of antenna outputs having weight values of respective antennas as coefficients. An output y(t) of an array antenna including M elements may be determined by:

$$y(t) = \sum_{i=1}^{M} w_i^* x_i(t) = w^H x(t) \qquad \text{Equation 1}$$

In Equation 1, $w_m$ represents a weight value of an $m^{th}$ antenna, x(t) represents an output of the $m^{th}$ antenna, and * represents a complex conjugate operator. An average output power p(w) of the array antenna is determined by:

$$P(w) = E[|y(t)|^2] = w^H E[x(t)x^H(t)]w = w^H R w \qquad \text{Equation 2}$$

In Equation 2, R represents a covariance matrix. Depending on a method for determining a weighted vector w, algorithms may be classified into a Bartlett beamforming algorithm and a Capon beamforming algorithm.

The Bartlett beamforming algorithm applies a spectrum analysis method based on Fourier transformation to an array antenna. This algorithm applies a large weight value to a signal incident in a specific direction to maximize a signal output. A weighted vector $w_{BF}$ of the Bartlett beamforming algorithm for maximizing an output of the array antenna for a signal incident in a specific direction θ is expressed as follows:

$$w_{BF} = \frac{a(\theta)}{\sqrt{a^H(\theta)a(\theta)}} \qquad \text{Equation 3}$$

In Equation 3, a(θ) represents a direction vector of a response of the array antenna with respect to the specific direction θ. By substituting Equation 3 for Equation 2, a spatial spectrum of Bartlett beamforming may be obtained as below.

$$P_{BF}(\theta) = \frac{a^H(\theta)Ra(\theta)}{a^H(\theta)a(\theta)} \qquad \text{Equation 4}$$

The Capon beamforming algorithm maintains a gain of a signal incident in a specific direction constant and at the same time, applies a small weight value to an interference signal or noise. An optimization problem for satisfying the above condition is as given below.

$$\min_{w} w^H R w \text{ subject to } w^H a(\theta) = 1 \qquad \text{Equation 5}$$

The optimization problem as given above maintains a gain in a specific direction as 1 and minimizes an interference signal and noise to improve a signal-to-noise ratio (SNR). The solution to Equation 5 is as given below.

$$w_{MV} = \frac{R^{-1}a(\theta)}{a^H(\theta)R^{-1}a(\theta)} \qquad \text{Equation 6}$$

A weighted vector $w_{MV}$ is substituted for Equation 2, thereby obtaining a spatial spectrum of Capon beamforming as given below.

$$P_{MV}(\theta) = \frac{1}{a^H(\theta)R^{-1}a(\theta)} \qquad \text{Equation 7}$$

A multiple signal classification (MUSIC) algorithm, used to estimate a direction angle, is a representative subspace-based algorithm. The subspace algorithm divides a space into a signal subspace and a noise subspace through eigenvalue decomposition (EVD) of a covariance matrix of an output of the array antenna to estimate a direction angle by using information of the subspaces. The MUSIC algorithm employs a feature in which an omnidirectional vector corresponding to an incident signal is orthogonal to the noise subspace. If L plane waves arrive at an array antenna having M elements, an input signal X may be expressed as below.

$$X = AF + N \qquad \text{Equation 8}$$

$$F = [F_1, F_2, \ldots, F_L]^T \qquad \text{Equation 9}$$

$$A = [a(\theta_1), a(\theta_2), \ldots, a(\theta_L)] \qquad \text{Equation 10}$$

$$a(\theta_L) = \begin{bmatrix} \exp\left(j2\pi \frac{d_1}{\lambda}\sin(\theta_L)\right) \\ \vdots \\ \exp\left(j2\pi \frac{d_M}{\lambda}\sin(\theta_L)\right) \end{bmatrix} \qquad \text{Equation 11}$$

Here, A represents a direction matrix, a ($\theta_L$) represents a direction vector, $F_L$ and $\theta_L$ represent a complex amplitude and a direction angle of an $L^{th}$ wave, respectively. λ represents a wavelength, $d_M$ represents a distance from a reference element to each element, and N represents thermal noise. The covariance matrix using Equation 8 may be expressed as follows:

$$R = E[XX^H] = AE[FF^H]A^H + E[NN^H] = ASA^H + \sigma^2 I \qquad \text{Equation 12}$$

In Equation 12, S represents a covariance matrix of F, and $\sigma^2$ represents a thermal noise power.

FIG. 2 is a diagram illustrating a method for calculating a direction of arrival (DOA) according to an embodiment of the present disclosure.

Referring to FIG. 2, for example, the number of array antennas is 2, reference numeral 230 indicates a direction component before occurrence of change, and reference numeral 240 indicates a direction component after occurrence of change. Reference numeral 250 represents a distance from a reference element to a moved element. Reference numeral 210 represents a direction vector after occurrence of change, and reference numeral 220 represents a direction vector before occurrence of change. An angle between reference numeral 210 and reference numeral 220 is φ. A beam steering value based on φ is as given by:

$$\vec{E}(\vec{r}, t) = \cos\left[2\pi f\left(t + \frac{\|\vec{r}_{blue}\|}{c}\right)\right] + \cos\left[2\pi f\left(t + \frac{\|\vec{r}_{red}\|}{c} + \Delta\varphi\right)\right] = \\ 2\cos\left[2\pi f\left(t + \frac{\|\vec{r}_{blue}\| + \|\vec{r}_{red}\|}{2c} + \frac{\Delta\varphi}{2}\right)\right] \\ \cos\left[2\pi f\left(\frac{\|\vec{r}_{blue}\| - \|\vec{r}_{red}\|}{2c} - \frac{\Delta\varphi}{2}\right)\right]$$

Equation 13

In Equation 13, the following section represents beam steering:

$$\left(\frac{\|\vec{r}_{blue}\| - \|\vec{r}_{red}\|}{2c} - \frac{\Delta\varphi}{2}\right)$$

and φ represents phase information of a received signal. $\vec{E}(\vec{r},t)$ represents a beam steering value. The c represents a constant value.

Figure 3A:
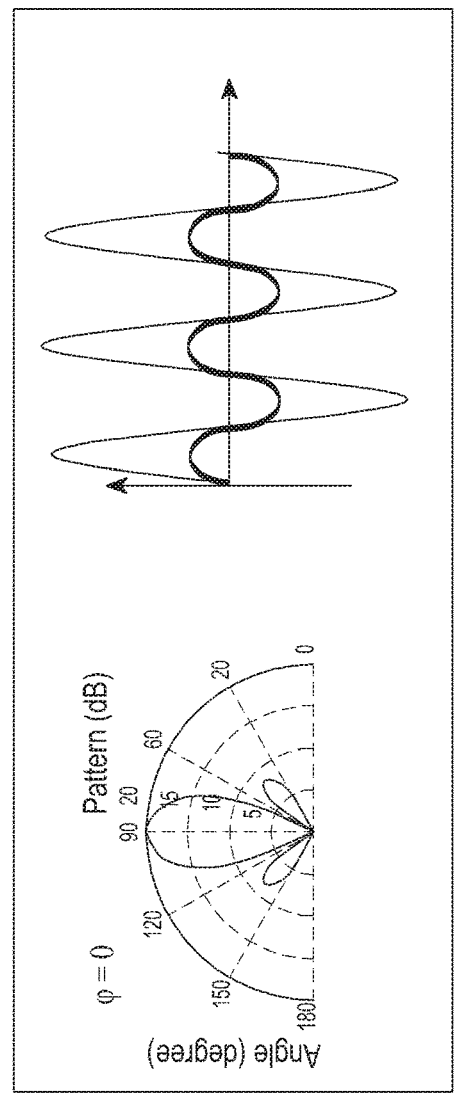
FIGS. 3A to 3C illustrate a changing operation of a direction angle or a beam width according to an embodiment of the present disclosure.
Figure 3A:
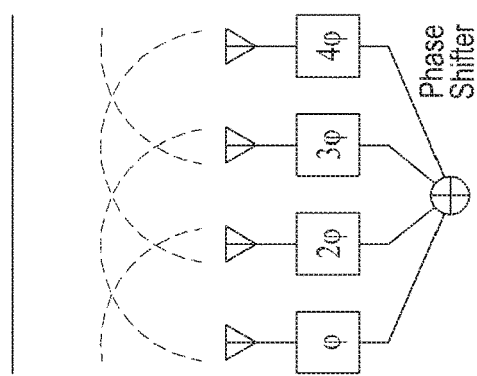
Figure 3B:
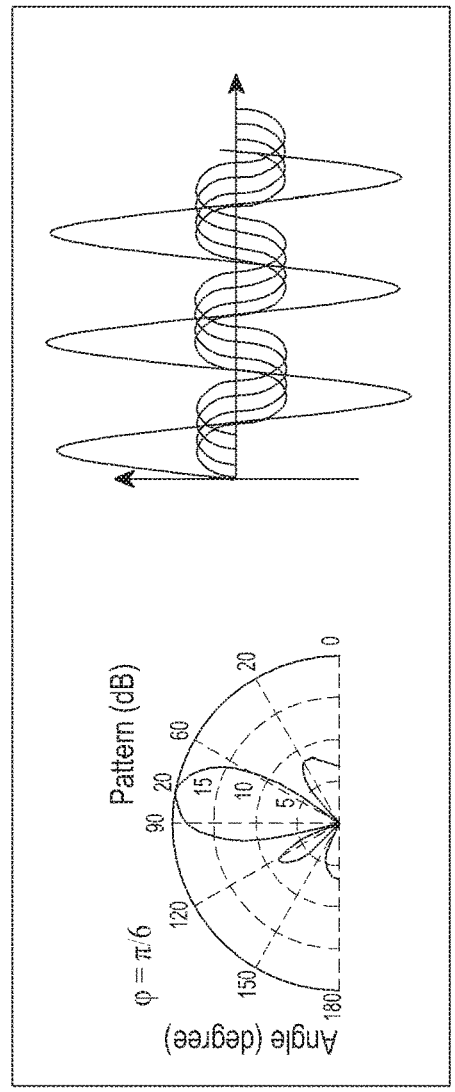
Figure 3B:
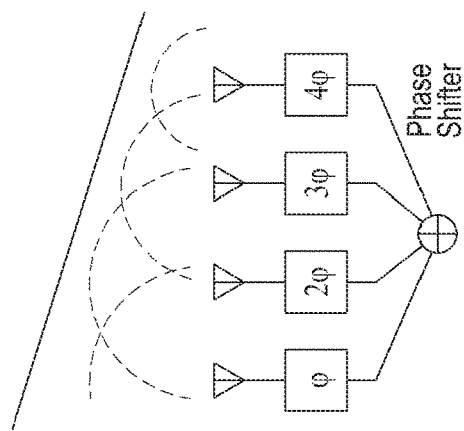
Figure 3C:
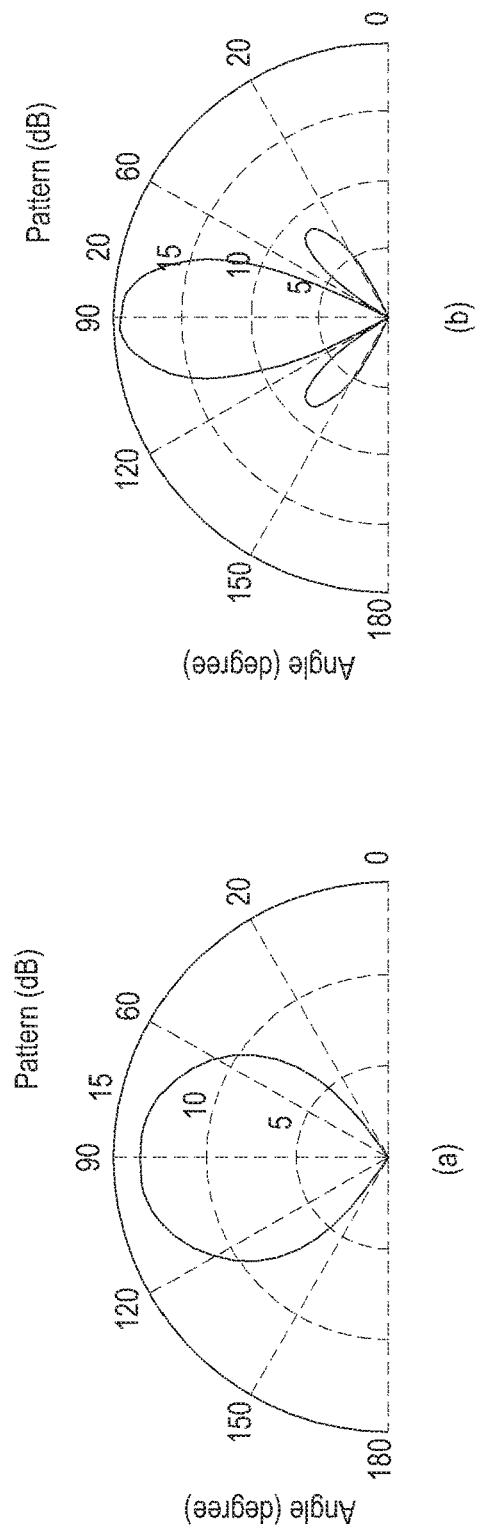

FIGS. 3A to 3C illustrate a changing operation of a direction angle or a beam width according to an embodiment of the present disclosure.

Referring to FIGS. 3A and 3B, a beam direction is provided depending on φ. As can be seen from FIGS. 3A and 3B, a beam direction differs with φ.

A beam steering value based on an root mean square (RMS) value is given by:

$$\vec{E}(\vec{r}, t) = \cos\left[2\pi f\left(t + \frac{\|\vec{r}_{blue}\|}{c}\right)\right] + \cos\left[2\pi f\left(t + \frac{\|\vec{r}_{red}\|}{c}\right)\right] = \\ 2\cos\left[2\pi f\left(t + \frac{\|\vec{r}_{blue}\| + \|\vec{r}_{red}\|}{2c}\right)\right] \cdot \\ \cos\left[2\pi f\left(\frac{\|\vec{r}_{blue}\| - \|\vec{r}_{red}\|}{2c}\right)\right]$$

Equation 14

In Equation 14, the following section represents the root-mean square value:

$$\cos\left[2\pi f\left(\frac{\|\vec{r}_{blue}\| - \|\vec{r}_{red}\|}{2c}\right)\right]$$

and $\vec{E}(\vec{r},t)$ represents a beam steering value.

As can be seen from (a) and (b) of FIG. 3C, a beam width changes with an RMS value.

A direction angle and a beam width of an AP that measures a position of a terminal change depending on the phase information of the received signal and the RMS value.

A tag or a wireless transmission and reception device transmits a wireless signal to a terminal by using wireless communication. Wireless communication may include Wi-Fi, 802.11ad, and beacon (BLE) communication. The terminal receives a radio signal and measures a distance by using a received signal strength indicator (RSSI) of the received signal. The RSSI is an indicator indicating a strength of a received signal. In an ideal environment where noise does not exist, an RSSI value of an identical radio signal with respect to an identical distance is constant at all times. The RSSI uses the unit of dBm, and the strength of the received signal increases as the RSSI value increases. The RSSI is inversely proportional to a square of the distance, such that the strength of the signal decreases as the distance increases. By using the RSSI feature, the terminal measures a distance between the tag or the wireless transmission/reception device and the terminal.

An embodiment of the present disclosure is applicable to a three-dimensional (3D) array antenna system, and the 3D array antenna system may include X coordinates, Y coordinates, and Z coordinates that are perpendicular to a plane formed by the X coordinates and the Y coordinates.

Figure 4:
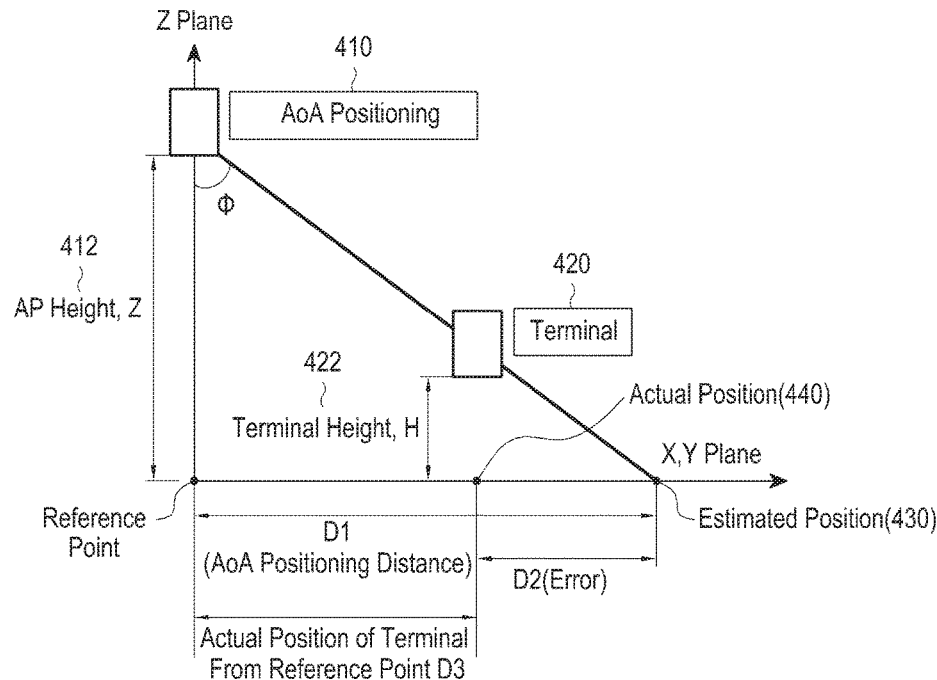
FIG. 4 is a diagram illustrating a method for estimating a position of a terminal according to an embodiment of the present disclosure.

FIG. 4 is a diagram illustrating a method for estimating a position of a terminal according to an embodiment of the present disclosure.

Referring to FIG. 4, the X coordinates and the Y coordinates in the 3D array antenna system indicate a distance (a horizontal position), and the Z coordinates in the 3D array antenna system indicate an altitude. Upon occurrence of an event for estimating a position of a terminal, an AP 410 measures height information 412 of the AP 410. The AP 410 identifies angle information between the terminal and the AP 410 by using AoA.

The AP 410 transmits a request for height information 422 of a terminal 420 to the terminal 420 and receives the height information 422 from the terminal 420. The AP 410 may identify the height information 422 of the terminal 420 by receiving barometric pressure sensor information from the terminal 420. The terminal 420 generates barometric pressure sensor information including a vertical movement amount (or an altitude value) of the terminal 420 based on a change of a barometric pressure measured using a barometric pressure sensor. The barometric pressure sensor information may be used as the same meaning as information about the barometric pressure sensor. The height information of the terminal 420 may be obtained using a gyro sensor, an acceleration sensor, a tilt sensor, a piezo sensor, and the like, as well as the barometric pressure sensor.

Moreover, a general user may directly input an average value and height information of a sensor into the terminal or the AP.

The AP 410 estimates a position 430 of X coordinates and Y coordinates based on the height information 412 of the AP 410, the height information 422 of the terminal 420, and the direction angle φ information.

Herein, a positioning distance from a reference point at which the AP 410 has a height of 0 to the position 430 is defined as D1, an actual distance of the terminal 420 from the reference point as D3, and a difference between D1 and D3 as a positioning error D2.

The actual distance D3 of the terminal 420 from the reference point may be obtained using the triangular proportionality theorem among the height information 412 of the AP 410, the height information 422 of the terminal 420, and the positioning distance D1 from the reference point to the position 430 of the X coordinates and the Y coordinates. The positioning error D2 according to an embodiment of the present disclosure may be estimated and corrected by subtracting D3 from D1. Herein, D2 may be reduced or minimized depending on the position 430 of the X coordinates and the Y coordinates.

Figure 5:
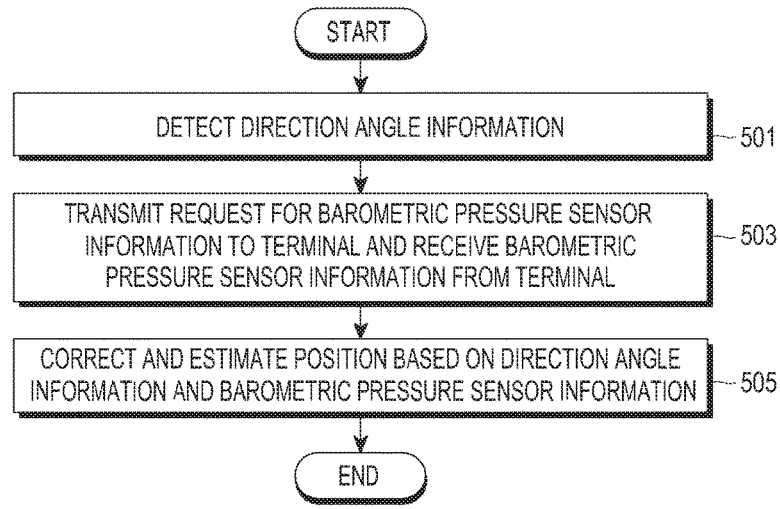
FIG. 5 is a flowchart illustrating a method for estimating a position of a terminal by an access point (AP) according to an embodiment of the present disclosure.

FIG. 5 is a flowchart illustrating a method for estimating a position of a terminal by an AP according to an embodiment of the present disclosure.

Referring to FIG. 5, the AP detects angle direction information in operation 501. The direction angle information includes at least one of the height information of the AP and the angle information between the terminal and the AP obtained using AoA. The direction angle information may be used as the same meaning as information about the direction angle.

The AP transmits a request for barometric pressure sensor information to the terminal and receives the barometric pressure sensor information from the terminal in operation 503. The terminal generates barometric pressure sensor information including a vertical movement amount (or an altitude value) of the terminal from a change in a barometric pressure measured using a barometric pressure sensor, and transmits the generated barometric pressure sensor information to the AP.

The AP estimates the position of the terminal based on the direction angle information and the barometric pressure sensor information in operation 505. More specifically, the AP corrects and estimates the positioning error D2 by subtracting D3 from D1 as described with reference to FIG. 4. Herein, D2 may be reduced or minimized depending on the position 430 of the X coordinates and the Y coordinates.

Figure 6:
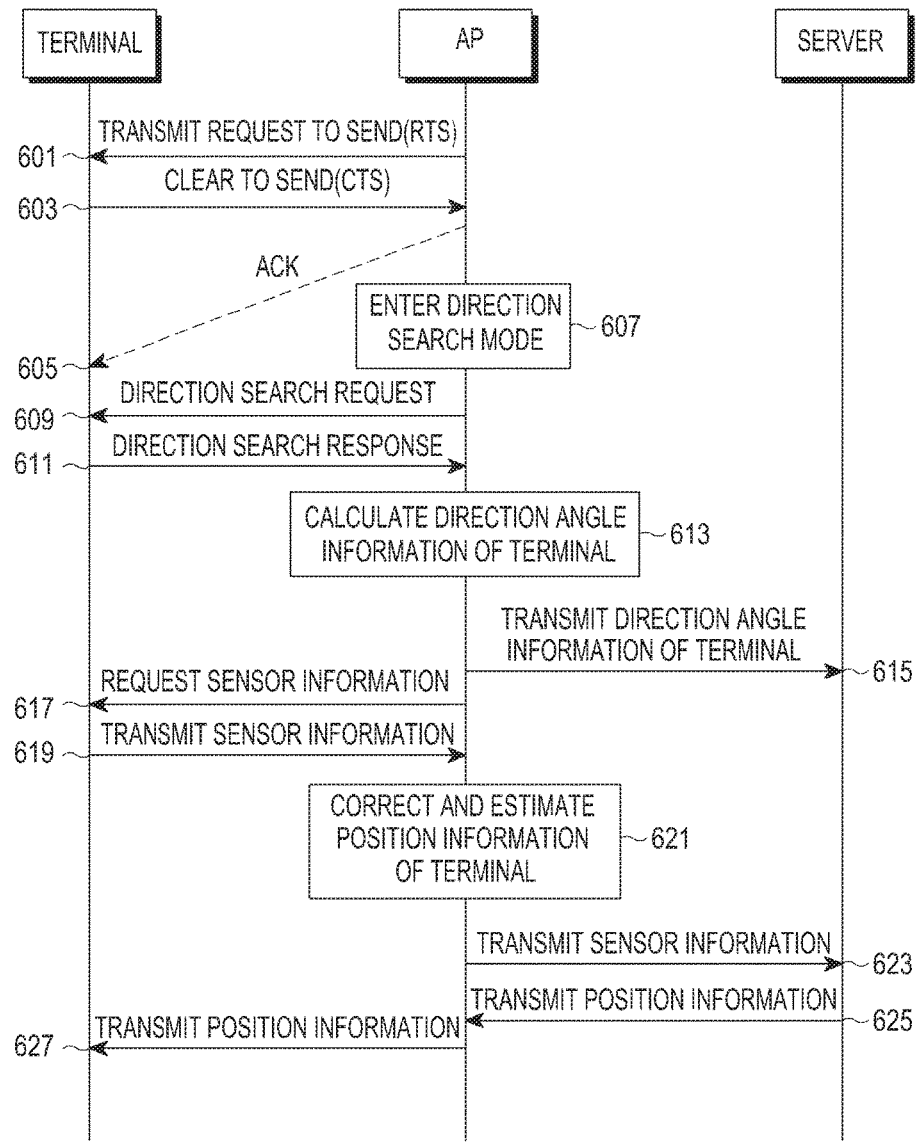
FIG. 6 is a flow diagram illustrating a method for estimating a position of a terminal by an AP according to a first embodiment of the present disclosure.

FIG. 6 is a flow diagram illustrating a method for estimating a position of a terminal by an AP according to a first embodiment of the present disclosure.

Referring to FIG. 6, the AP transmits a request to send (RTS) frame for requesting transmission of a beacon signal to the terminal in operation 601. The AP receives a clear to send (CTS) frame indicating whether transmission is possible from the terminal in operation 603. The AP transmits an ACK message to the terminal in response to the CTS frame in operation 605. Here, the transmitting of the ACK message in operation 605 may be selectively performed. The AP enters a direction search mode for estimating a position of the terminal in operation 607. The entering to the direction search mode may be performed by the AP at the request of the terminal or without a request from the terminal.

The AP transmits a direction search request message to the terminal in operation 609. The AP receives a direction search response message from the terminal in operation 611. The AP receives information necessary for calculating direction angle information of the terminal from the terminal. The direction angle information of the terminal includes at least one of angle information between the terminal and the AP obtained using AoA.

The AP calculates the direction angle information of the terminal in operation 613. The direction angle information of the terminal calculated in operation 613 includes at least one of height information of the AP and the angle information between the terminal and the AP obtained using AoA. In an additional embodiment of the present disclosure, the AP calculates the direction angle information by using phase information of a signal received from the terminal in operation 613. The direction angle information may be determined depending on a phase difference between different signals.

The AP transmits the calculated direction angle information of the terminal to a server in operation 615. The AP transmits a request for barometric pressure sensor information to the terminal to identify the height information of the terminal in operation 617. The terminal then generates the barometric pressure sensor information including a vertical movement amount (or an altitude value) of the terminal from a change in a barometric pressure measured using a barometric pressure sensor, and transmits the barometric pressure sensor information to the AP in operation 619.

The AP estimates a position of the terminal based on the calculated direction angle information and the received barometric pressure sensor information in operation 621.

The AP may identify the height information of the terminal by receiving the barometric pressure sensor information from the terminal. The terminal generates the barometric pressure sensor information including the vertical movement amount (or the altitude value) of the terminal from a change in a barometric pressure sensor measured using the barometric pressure sensor. The height information of the terminal may be obtained using a gyro sensor, an acceleration sensor, a tilt sensor, a piezo sensor, and the like, as well as the barometric pressure sensor.

The AP transmits the barometric pressure sensor information to the server in operation 623 after operation 621.

The AP receives position information of the terminal, estimated based on the calculated direction angle information and the received barometric pressure sensor information, from the server in operation 625. The AP transmits the received estimated position information of the terminal to the terminal in operation 627.

Operations 615, 623, and 625 of FIG. 6 are needed to estimate the position of the terminal in the server, and thus may be skipped. Operation 627 of FIG. 6 may also be skipped.

Operations 617 and 619 of FIG. 6 may be performed prior to operation 609 or operation 613.

Figure 7:
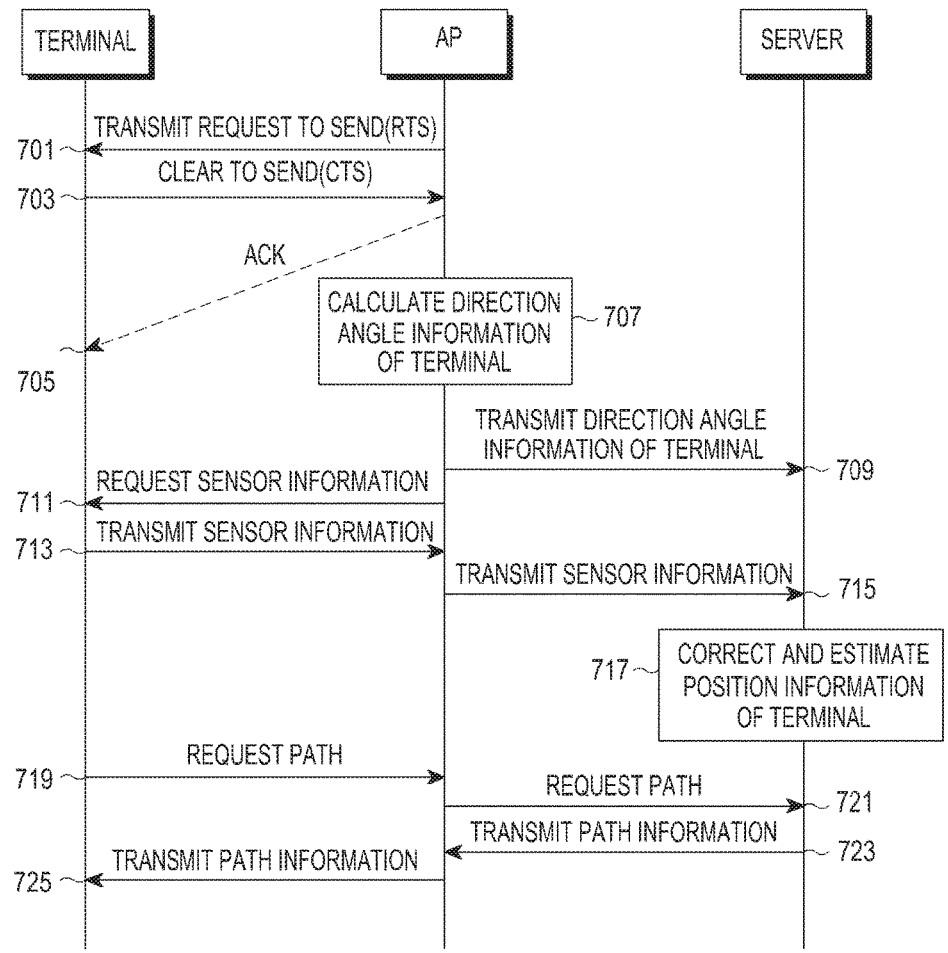
FIG. 7 is a flow diagram illustrating a method for estimating a position of a terminal by an AP according to a second embodiment of the present disclosure.

FIG. 7 is a flow diagram illustrating a method for estimating a position of a terminal by an AP according to a second embodiment of the present disclosure.

Referring to FIG. 7, the AP transmits an RTS frame for requesting transmission of a beacon signal to the terminal in operation 701.

The position information of the terminal is estimated for the AP in FIG. 6, whereas the position information of the terminal is estimated for the server in FIG. 7.

The AP receives a CTS frame indicating whether transmission is possible from the terminal in operation 703.

The AP transmits an ACK message to the terminal in response to the CTS frame in operation 705. Herein, the transmitting of the ACK message in operation 705 may be selectively performed.

The AP calculates direction angle information of the terminal in operation 707. The direction angle information of the terminal calculated in operation 707 includes at least one of height information of the AP and angle information between the terminal and the AP obtained using AoA. The height information of the AP herein may be determined previously or may include a measured value of a height of the AP.

The AP transmits the calculated direction angle information of the terminal to the server in operation 709.

The AP transmits a request for barometric pressure sensor information to the terminal in operation 711. The terminal then generates the barometric pressure sensor information including a vertical movement amount (or an altitude value) of the terminal from a change in a barometric pressure measured using a barometric pressure sensor, and transmits the generated barometric pressure sensor information to the AP in operation 713.

The AP transmits the barometric pressure sensor information received from the terminal to the server in operation 715. The server then estimates a position of the terminal based on the direction angle information and the barometric pressure sensor information received from the AP in operation 717.

Upon receiving a path request message from the terminal in operation 719, the AP transmits the path request message to the server in operation 721. The server then transmits a path response message including the estimated position information of the terminal to the terminal through the AP in operations 723 and 725.

Operations 711, 713, and 715 of FIG. 7 may be performed prior to operation 707.

Figure 8:
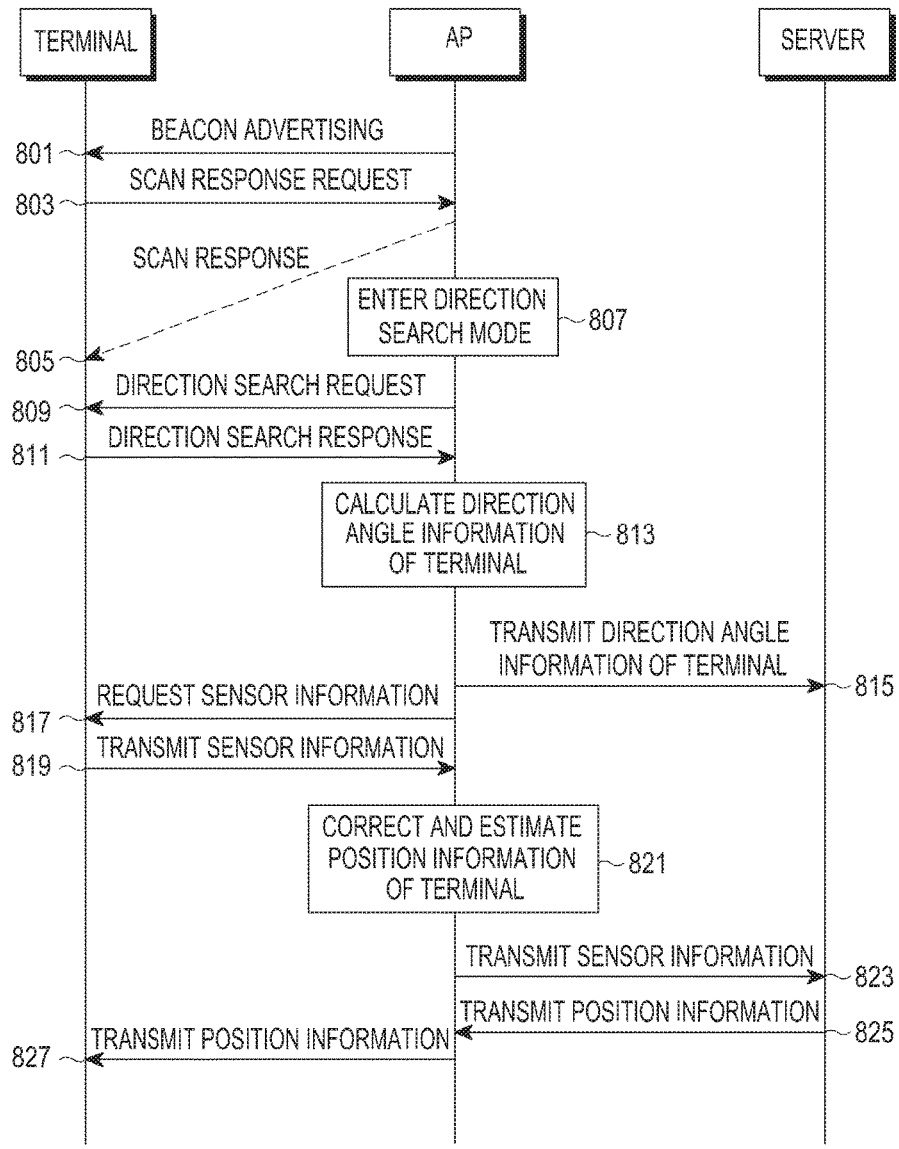
FIG. 8 is a flow diagram illustrating a method for estimating a position of a terminal by an AP according to a third embodiment of the present disclosure.

FIG. 8 is a flow diagram illustrating a method for estimating a position of a terminal by an AP according to a third embodiment of the present disclosure.

Referring to FIG. 8, a terminal indicates a BLE device that operates for a long time with a single battery and is connectable with multiple central devices using subminiature, low-power, and small resources. Representative examples of the BLE device may include a heartbeat measurement device, a distance deviation indicating tag, and so forth.

The AP transmits a beacon advertisement packet to the terminal in operation 801. The terminal detects devices in a short range from beacon advertisement data received from the AP. The detected devices may be devices that have already join a group or may be new devices.

The AP receives a request message for requesting a scan response from the terminal in operation 803. The AP transmits a scan response message to the terminal in operation 805. Operation 805 may be skipped.

The AP enters a direction search mode in operation 807. The AP then transmits a direction search request to the terminal in operation 809, and receives a direction search response from the terminal in operation 811. For example, the AP searches for directions of nearby devices. The entering to the direction search mode may be performed at the request of a user or may be automatically performed at a preset time.

The AP calculates direction angle information of the terminal in operation 813. The direction angle information of the terminal may be obtained using height information of the AP and angle information between the terminal and the AP obtained using AoA. Herein, the height information of the AP may be a preset value or may be a measured value of a height of the AP.

The AP transmits the calculated direction angle information of the terminal to the server in operation 815.

The AP transmits a request for barometric pressure sensor information to the terminal in operation 817. The terminal then generates barometric pressure sensor information including a vertical movement amount (or an altitude value) of the terminal from a change in a barometric pressure measured using a barometric pressure sensor, and transmits the generated barometric pressure sensor information to the AP in operation 819.

The AP corrects and estimates a position of the terminal based on the direction angle information and barometric pressure sensor information in operation 821.

The AP transmits the corrected and estimated position information to the terminal in operation 827.

In an additional embodiment of the present disclosure, the AP transmits the barometric pressure sensor information received from the terminal to the server in operation 823, and receives the corrected and estimated position information from the operation 825.

Operations 817, 819, and 823 of FIG. 8 may be performed prior to operation 807.

In the fourth embodiment of the present disclosure, for management of a store that sells, for example, clothes, a tag exists in place of the terminal shown in FIGS. 4 to 8. The tag may be attached to a product, such as clothes. In the fourth embodiment of the present disclosure, a barometric pressure sensor may be attached to the tag.

Figure 9:
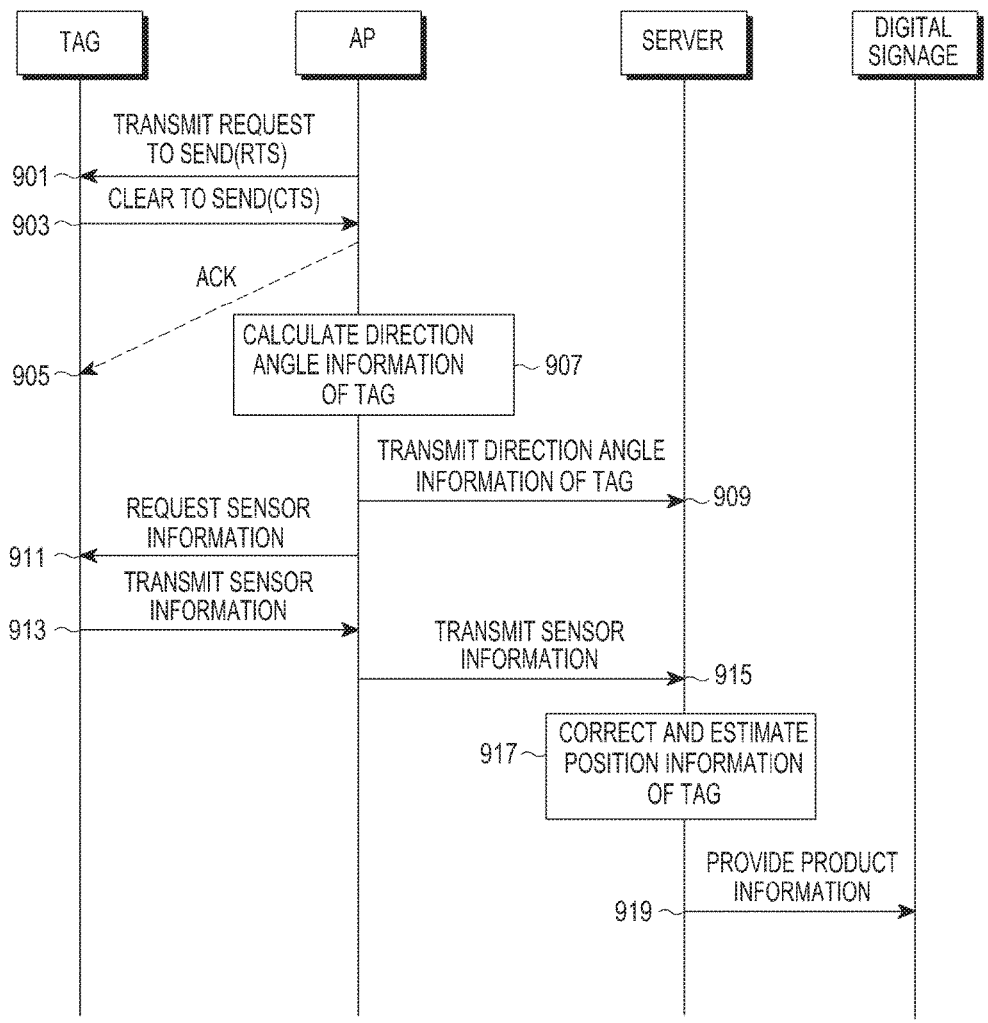
FIG. 9 is a flow diagram illustrating a method for estimating a position of a terminal by an AP according to a fourth embodiment of the present disclosure.

FIG. 9 is a flow diagram illustrating a method for estimating a position of a terminal by an AP according to a fourth embodiment of the present disclosure.

Referring to FIG. 9, in operation 901, the AP transmits an RTS frame for requesting transmission of a beacon signal to the tag. In operation 903, the AP receives a CTS frame indicating whether transmission is possible from the tag.

The AP transmits an ACK message to the tag in response to the CTS frame in operation 905. Herein, the transmitting of the ACK message may be performed selectively.

The AP calculates direction angle information of the tag in operation 907. The direction angle information of the tag in operation 907 includes height information of the AP and angle information between the tag and the AP.

In operation 909, the AP transmits the calculated direction angle information of the tag to the server.

The AP transmits a request for barometric pressure sensor information to the tag in operation 911. The tag then generates barometric pressure sensor information including a vertical movement amount (or an altitude value) of the tag from a change in a barometric pressure measured using a barometric pressure sensor, and transmits the generated barometric pressure sensor information to the AP in operation 913.

The AP then transmits the barometric pressure sensor information received from the tag to the server in operation 915. In operation 917, the server then estimates a position of the tag based on the direction angle information and barometric pressure sensor information that are received from the AP. The server transmits product information including the estimated position information of the tag to a digital signage in operation 919. The digital signage may then accurately identify the position of the tag by using the product information and display the accurate position information of the tag. Although the digital signage is taken as an example in FIG. 9, any digital device is applicable.

Operations 911, 913, and 915 of FIG. 9 may be performed prior to operation 907.

Figure 10:
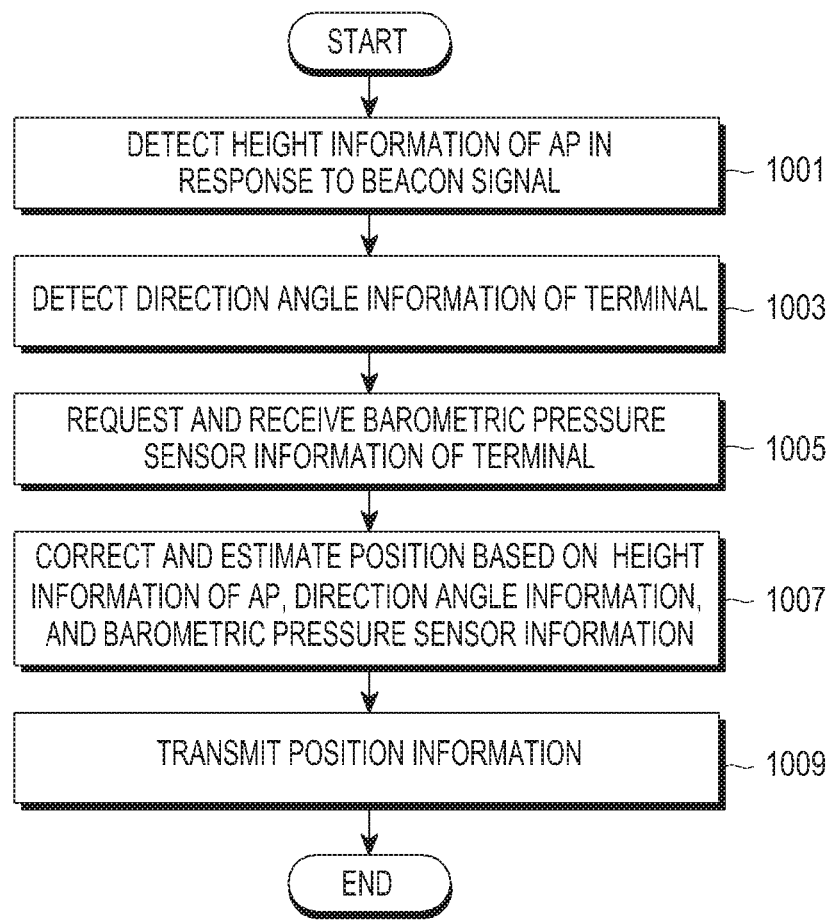
FIG. 10 is a flowchart illustrating a method for estimating a position of a terminal by an AP according to the first embodiment of the present disclosure.

FIG. 10 is a flowchart illustrating a method for estimating a position of a terminal by an AP according to the first embodiment of the present disclosure.

Referring to FIG. 10, the AP detects height information of the AP in response to a beacon signal in operation 1001. The AP detects direction angle information of the terminal including the angle information between the terminal and the AP obtained using AoA in operation 1003.

The AP transmits a request for barometric pressure sensor information to the terminal to obtain height information of the terminal, and receives the barometric pressure sensor information from the terminal in operation 1005. The terminal generates the barometric pressure sensor information including a vertical movement amount (or an altitude value) of the terminal based on a change of a barometric pressure measured using a barometric pressure sensor, and transmits the generated barometric pressure sensor information to the AP. The height information of the terminal may be obtained using a gyro sensor, an acceleration sensor, a tilt sensor, a piezo sensor, and the like, as well as the barometric pressure sensor.

The AP then corrects and estimates a position of the terminal based on the height information of the AP, the direction angle information, and the pressure sensor information in operation 1007. More specifically, as described with reference to FIG. 4, the positioning error D2 may be corrected and estimated by subtracting D3 from D1. Here, positioning error D2 may be reduced or minimized depending on the position 430 of the X coordinates and the Y coordinates.

The AP transmits the estimated position information of the terminal to the terminal, the tag, or the server in operation 1009.

The orders of operations 1001, 1003, and 1005 of FIG. 10 are interchangeable with each other.

Figure 11:
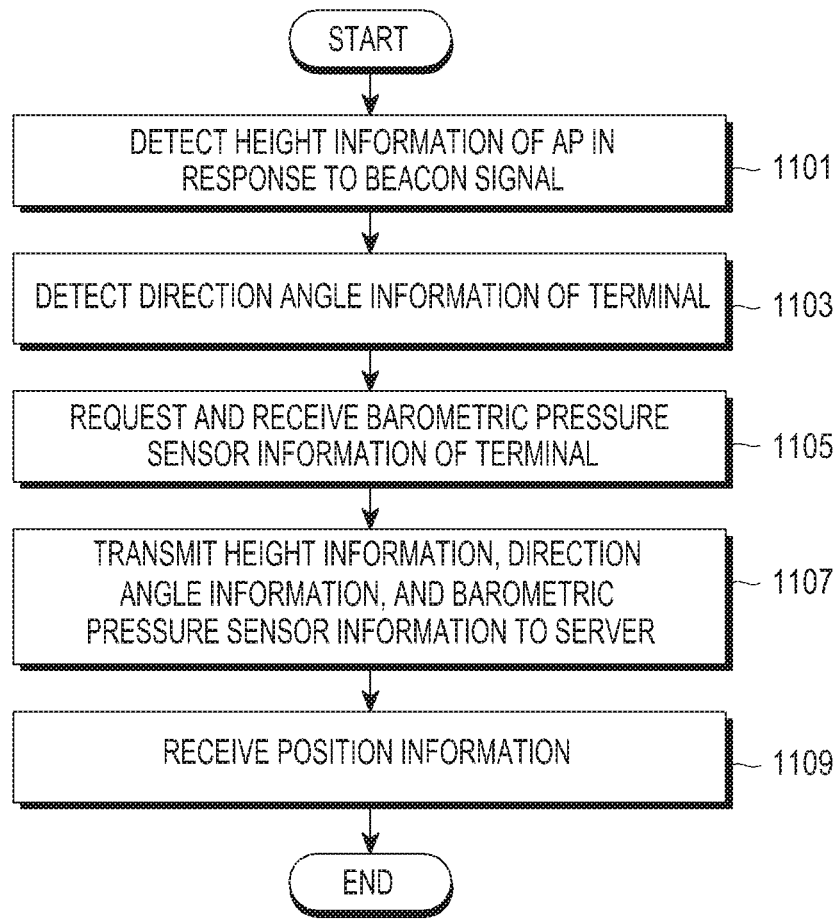
FIG. 11 is a flowchart illustrating a method for estimating a position of a terminal by an AP according to the first embodiment of the present disclosure.

FIG. 11 is a flowchart illustrating a method for estimating a position of a terminal by an AP according to the first embodiment of the present disclosure.

Referring to FIG. 11, the AP detects the height information of the AP in response to a beacon signal in operation 1101. The AP detects direction angle information of the terminal including angle information between the terminal and the AP obtained using AoA in operation 1103.

The AP transmits a request for barometric pressure sensor information to the terminal to obtain height information of the terminal and receives the barometric pressure sensor information from the terminal in operation 1105. The terminal generates the barometric pressure sensor information including a vertical movement amount (or an altitude value) of the terminal from a change in a barometric pressure measured using a barometric pressure sensor, and transmits the generated barometric pressure sensor information to the AP.

The AP then transmits the height information of the AP, the direction angle information, and the barometric pressure sensor information to the server for estimation of a position of the terminal by the server in operation 1107. In the embodiment shown in FIG. 11, the AP does not estimate the position of the terminal.

The AP receives the estimated position information of the terminal from the server and delivers the received position information of the terminal to the terminal in operation 1109. The server estimates the position information of the terminal, and the positioning error D2 may be corrected and estimated by subtracting D3 from D1. Herein, the positioning error D2 may be reduced or minimized depending on the position 430 of X coordinates and Y coordinates.

More specifically, as described with reference to FIG. 4, the positioning error D2 may be corrected and estimated by subtracting D3 from D1. Herein, the positioning error D2 may be reduced or minimized depending on the position 430 of X coordinates and Y coordinates.

Orders of operations 1101, 1103, and 1105 are interchangeable with each other.

Figure 12:
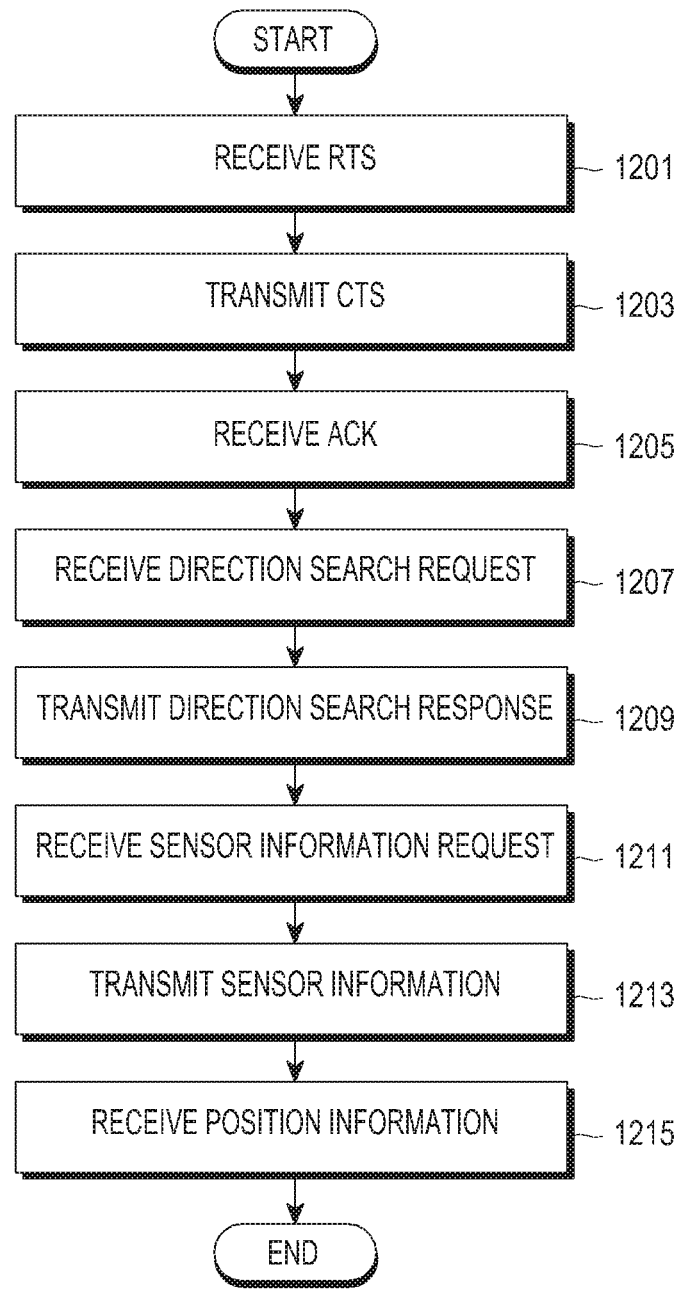
FIG. 12 is a flowchart illustrating operations of a terminal when an AP or a server corrects and estimates a position of a terminal according to an embodiment of the present disclosure.

FIG. 12 is a flowchart illustrating operations of a terminal when an AP or a server corrects and estimates a position of a terminal according to an embodiment of the present disclosure.

Referring to FIG. 12, the terminal receives an RTS frame from the AP in operation 1201. The terminal transmits a CTS frame to the AP in operation 1203. The terminal receives an ACK message from the AP in operation 1205. The reception of the ACK message by the terminal may be selectively performed.

The terminal receives a direction search request message for requesting direction angle information of the terminal from the AP in operation 1207.

The terminal transmits a direction search response message including the direction angle information of the terminal to the AP in operation 1209. Herein, the direction angle information of the terminal includes at least one of angle information between the terminal and the AP obtained using AoA.

The terminal receives a message requesting barometric pressure sensor information from the AP in operation 1211.

The terminal transmits a response message including the barometric pressure sensor information to the AP in response to the message requesting the barometric pressure sensor information in operation 1213.

The terminal generates barometric pressure sensor information including a vertical movement amount (or an altitude value) of the terminal based on a change of a barometric pressure measured using a barometric pressure sensor. The height information of the terminal may be obtained using a gyro sensor, an acceleration sensor, a tilt sensor, a piezo sensor, and the like, as well as the barometric pressure sensor.

The terminal eventually receives the position information of the terminal from the AP in operation 1215. The position information of the terminal includes the position information of the terminal estimated by the AP or the server.

The positioning error D2 may be corrected and estimated by subtracting D3 from D1. Herein, the positioning error D2 may be reduced or minimized depending on the position 430 of the X coordinates and the Y coordinates.

Operation 1205 of FIG. 12 may be skipped, and orders of operations 1207 to 1213 are interchangeable with each other.

Figure 13:
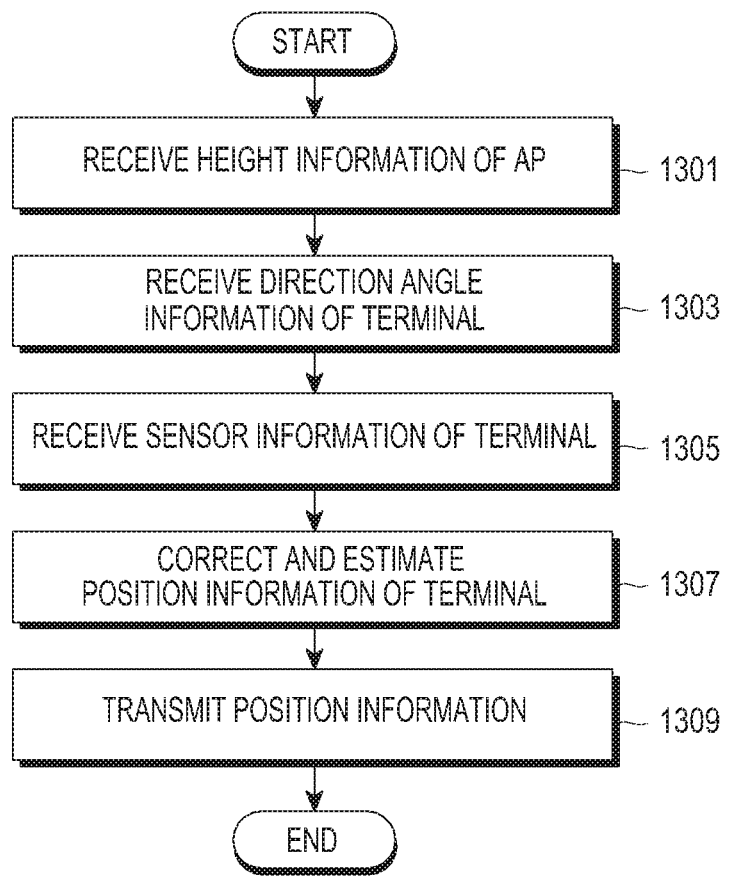
FIG. 13 is a flowchart illustrating a method for estimating a position of a terminal by a server according to an embodiment of the present disclosure.

FIG. 13 is a flowchart illustrating a method for estimating a position of a terminal by a server according to an embodiment of the present disclosure.

Referring to FIG. 13, the server receives height information of the AP from the AP in operation 1301.

The server receives angle information between the tag and the AP (or angle information between the terminal and the AP) obtained using AoA from the AP. In an additional embodiment of the present disclosure, the server receives phase information based on a received signal strength from the AP and determines direction angle information of the terminal based on the received phase information, in operation 1303.

The terminal transmits a radio signal to the AP using wireless communication. Wireless communication may include NFC, ZigBee, Wi-Fi, beacon (BLE) communication, and the like. The AP receives a radio signal and measures a distance using a RSSI of the received signal. The RSSI is an indicator indicating a strength of a received signal. In an ideal environment where noise does not exist, an RSSI value of an identical radio signal with respect to an identical distance is constant at all times. The RSSI uses the unit of dBm, and the strength of the received signal increases as the RSSI value increases. The RSSI is inversely proportional to a square of the distance, such that the strength of the signal decreases as the distance increases. By using the RSSI feature, the AP measures a distance between the terminal and the AP.

The server receives barometric pressure sensor information of the terminal from the AP in operation 1305. The terminal generates barometric pressure sensor information including a vertical movement amount (or an altitude value) of the terminal based on a change of a barometric pressure measured using a barometric pressure sensor. The height information of the terminal may be obtained using a gyro sensor, an acceleration sensor, a tilt sensor, a piezo sensor, and the like, as well as the barometric pressure sensor.

The server estimates position information of the terminal based on height information of the AP, angle φ information, and the barometric pressure sensor information of the terminal in operation 1307. In an additional embodiment of the present disclosure, the server estimates the position information of the terminal based on the direction angle information of the terminal and the barometric pressure sensor information of the terminal in operation 1307. The positioning error D2 may be estimated and corrected by subtracting D3 from D1. D2 may be reduced or minimized depending on the position 430 of the X coordinates and the Y coordinates.

In an additional embodiment of the present disclosure, the AP calculates phase information based on the received signal, calculates signal strength information, and transmits the calculated phase information and signal strength information to the server. The server then determines the direction angle information of the terminal and a distance between the terminal and the AP.

The server transmits the estimated position information to the AP or to the terminal through the AP in operation 1309.

Orders of operations 1301, 1303, and 1305 of FIG. 13 are interchangeable with each other.

Figure 14:
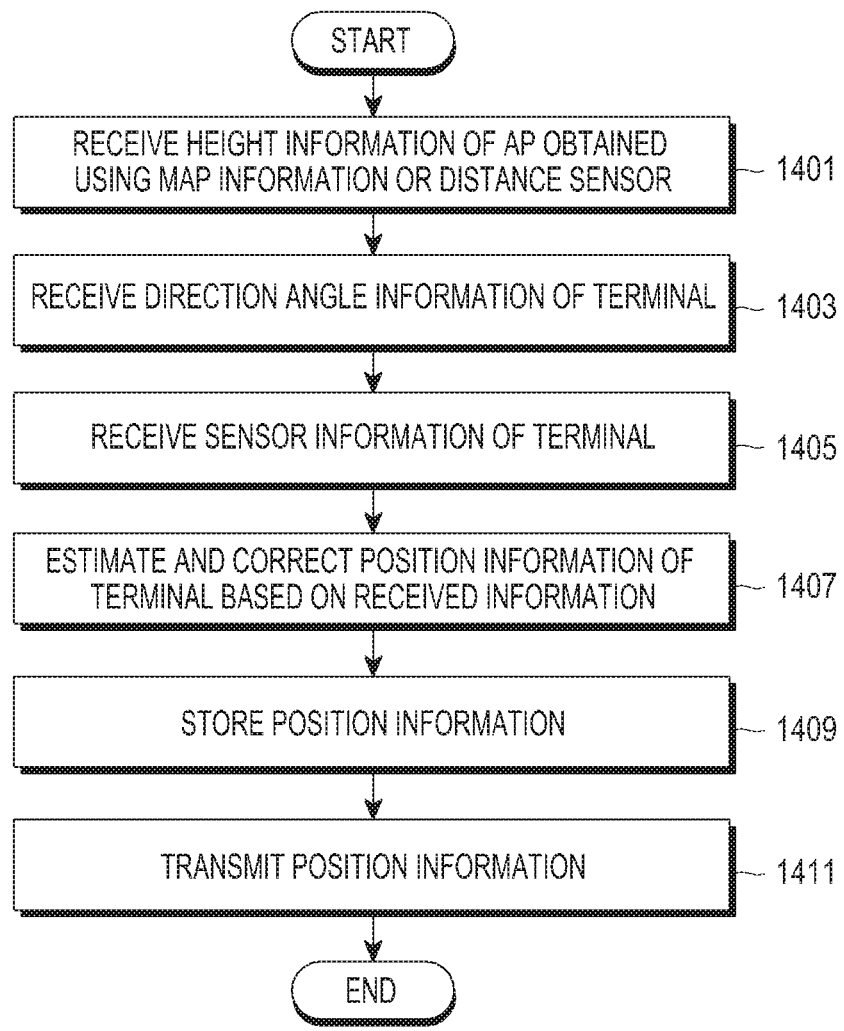
FIG. 14 is a flowchart illustrating a method for estimating a position of a terminal by a server according to an embodiment of the present disclosure.

FIG. 14 is a flowchart illustrating a method for estimating a position of a terminal by a server according to an embodiment of the present disclosure.

Referring to FIG. 14, the server receives height information of the AP obtained using map information or a distance sensor from the AP in operation 1401. In an additional embodiment of the present disclosure, a distance between the AP and the terminal may be measured using the received signal strength received from the terminal, and the height information of the AP may be determined based on the triangular proportionality theorem and the barometric pressure sensor information.

The server receives direction angle information of the terminal from the AP in operation 1403. The direction angle information of the terminal includes angle information between the terminal and the AP obtained using AoA.

The server receives sensor information of the terminal from the AP in operation 1405. The terminal generates barometric pressure sensor information including a vertical movement amount (or an altitude value) of the terminal based on a change of a barometric pressure measured using a barometric pressure sensor, and transmits the generated barometric pressure sensor information to the server through the AP. The height information of the terminal may be obtained using a gyro sensor, an acceleration sensor, a tilt sensor, a piezo sensor, and the like, as well as the barometric pressure sensor.

The server estimates and corrects position information of the terminal based on information (the height information of the AP obtained using the map information or the distance sensor, the direction angle information of the terminal, and the barometric pressure sensor information of the terminal) received from the AP in operation 1407. As described with reference to FIGS. 1A to 1C, the positioning error D2 may be corrected and estimated by subtracting D3 from D1. Herein, the positioning error D2 may be reduced or minimized depending on the position 430 of the X coordinates and the Y coordinates.

The server stores the estimated and corrected position information of the terminal in a database in operation 1409.

The server transmits the estimated and corrected position information of the terminal to the AP or to the terminal through the AP in operation 1411.

Orders of operations 1401, 1403, and 1405 of FIG. 14 are interchangeable with each other.

Figure 15:
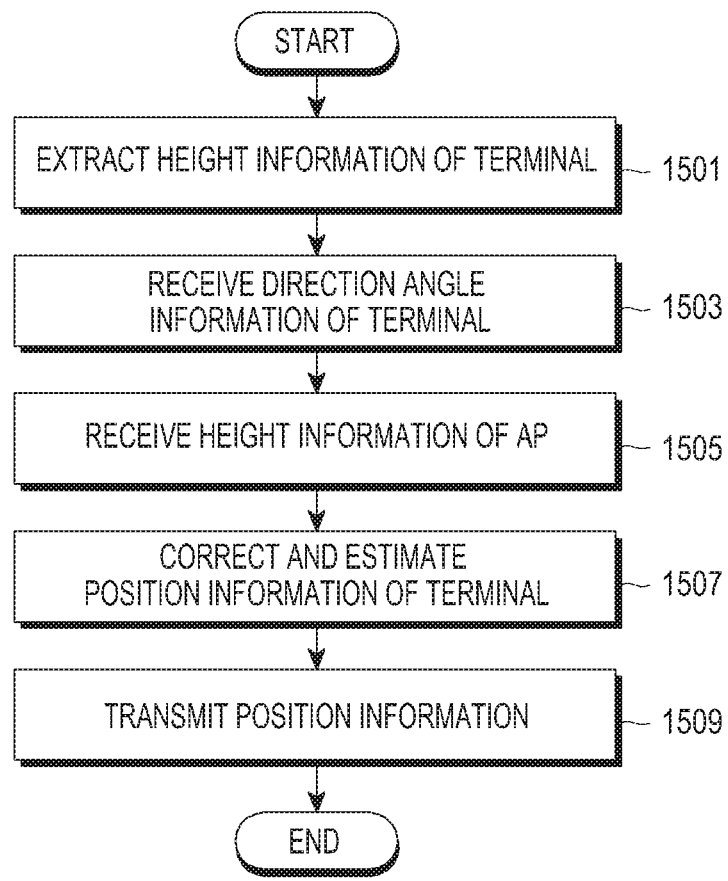
FIG. 15 is a flowchart illustrating a method for estimating a position of a terminal by a terminal according to an embodiment of the present disclosure.

FIG. 15 is a flowchart illustrating a method for estimating a position of a terminal by a terminal according to an embodiment of the present disclosure.

Referring to FIG. 15, the terminal corrects and estimates position information thereof.

The terminal extracts height information thereof in operation 1501. The height information of the terminal may be obtained using barometric pressure sensor information. The terminal generates the barometric pressure sensor information including a vertical movement amount (or an altitude value) of the terminal from a change in a barometric pressure measured using a barometric pressure sensor.

The height information of the terminal may be obtained using a gyro sensor, an acceleration sensor, a tilt sensor, a piezo sensor, and the like, as well as the barometric pressure sensor.

The terminal receives direction angle information of the terminal from the AP in operation 1503. The direction angle information of the terminal includes angle information between the terminal and the AP obtained using AoA.

The terminal receives height information of the AP from the AP in operation 1505. The height information of the AP may be obtained using a distance sensor or map information.

In an additional embodiment of the present disclosure, a distance between the AP and the terminal is measured using a received signal strength received from the terminal and the height information of the AP may be determined based on the triangular proportionality theorem and the barometric pressure sensor information.

In an additional embodiment of the present disclosure, the terminal receives phase information (direction information) of the terminal from the AP to obtain the angle information between the terminal and the AP and the height information of the AP, in place of operations 1503 and 1505. The terminal corrects and estimates position information of the terminal based on the height information of the terminal, the height information of the AP, and the angle information between the terminal and the AP in operation 1507.

The terminal transmits the corrected and estimated position information of the terminal to the AP or to the server through the AP in operation 1509.

Orders of operations 1501, 1503, and 1505 of FIG. 15 are interchangeable with each other.

Figure 16:
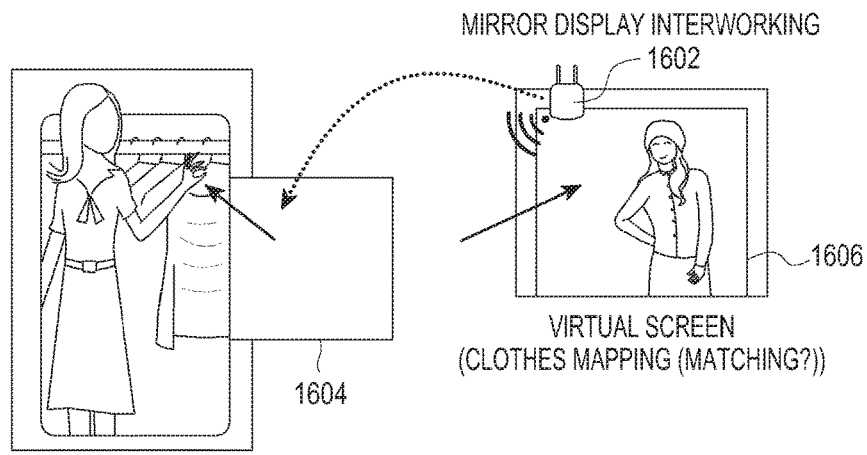
FIG. 16 is a diagram illustrating a store management method according to the fourth embodiment of the present disclosure.

FIG. 16 is a diagram illustrating a store management method according to the fourth embodiment of the present disclosure.

Referring to FIG. 16, reference numeral 1604 indicates a tag or sensor attached to, for example, clothes or a clothes hanger in a clothes store.

Reference numeral 1606 indicates a digital signage that is connected with a server not shown in FIG. 16 and exists in the clothes store. The digital signage 1606 includes a position estimator 1602 and operates with a tag or sensor 1604 through the position estimator 1602. The digital signage 1606 displays a virtual clothes matching image reflecting a user's intention. The virtual clothes matching image refers to an image that reflects user's preference determined based on the number of times the tag (or sensor 1604) moves. Thus, according to the fourth embodiment of the present disclosure, the user's intention may be identified and product information which the user is interested in may be provided.

The fourth embodiment of the present disclosure will be described below with reference to FIGS. 17 to 19.

Figure 17:
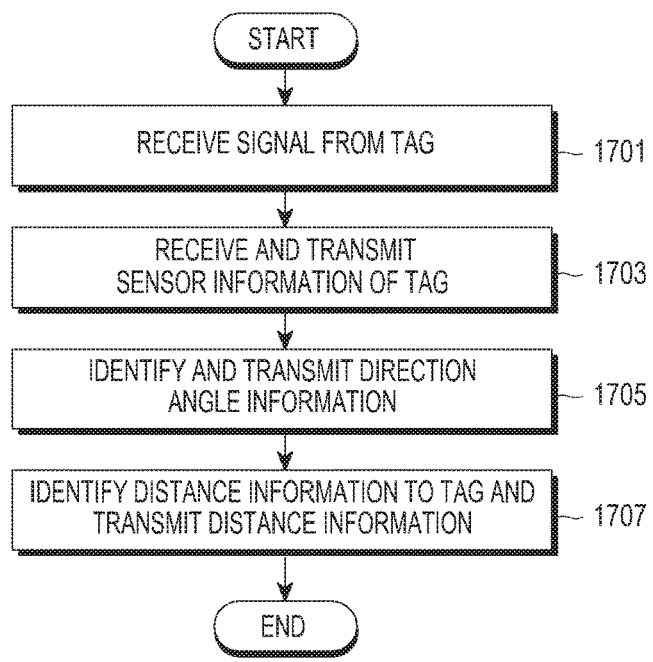
FIG. 17 is a flowchart illustrating a position estimation method for store management by an AP according to the fourth embodiment of the present disclosure.

FIG. 17 is a flowchart illustrating a position estimation method for store management by an AP according to the fourth embodiment of the present disclosure.

Referring to FIG. 17, the AP receives a signal from a tag attached to a clothes hanger in a store in operation 1701. The AP receives sensor information of the tag from the tag and transmits the received sensor information to a server in operation 1703. From the sensor information of the tag, height information of the tag may be identified. More specifically, the height information of the tag may be identified from barometric pressure sensor information of a barometric pressure sensor attached to the tag.

The AP identifies direction angle information of the tag from the tag and transmits the identified direction angle information to the server in operation 1705. The direction angle information of the tag includes at least one of angle information between the tag and the AP obtained using AoA.

The AP identifies distance information to the tag and transmits the identified distance information to the server in operation 1707.

Although not shown in FIG. 17, the AP may receive estimated position information of the tag from the server after operation 1707. Orders of operations 1703 and 1705 are interchangeable with each other.

Figure 18:
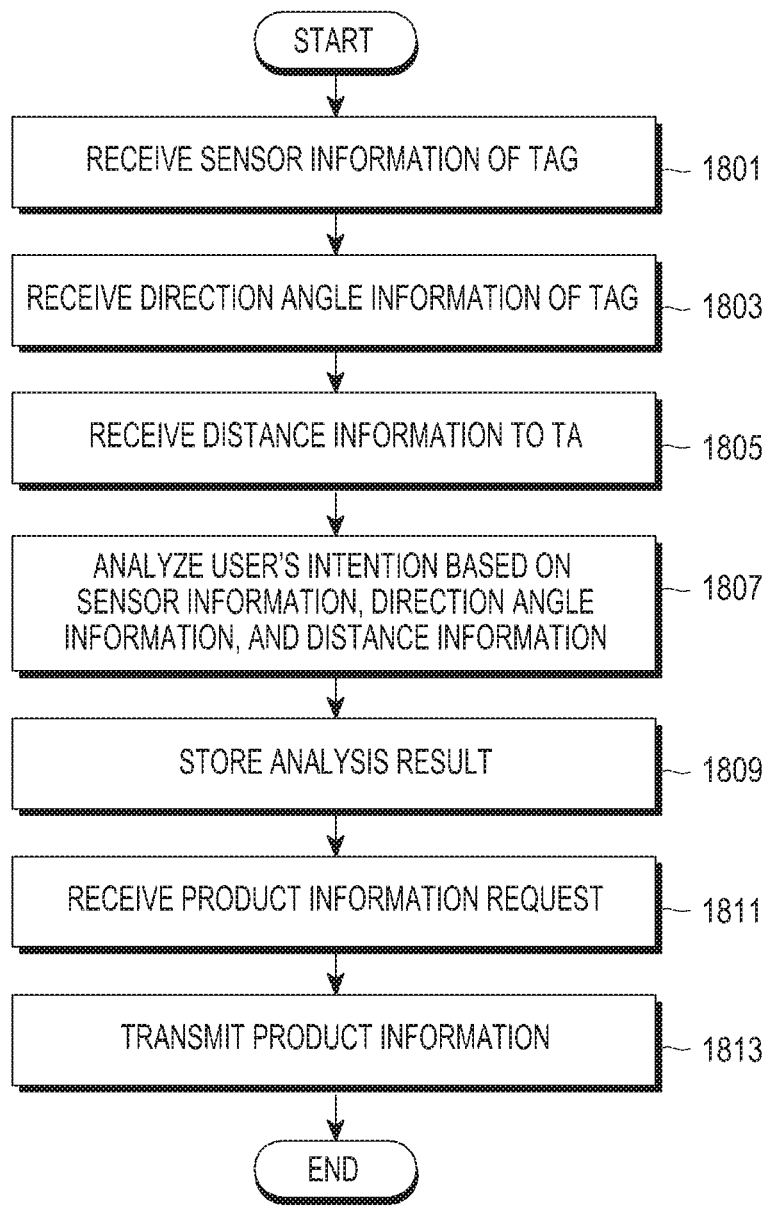
FIG. 18 is a flowchart illustrating a position estimation method for store management by a server according to the fourth embodiment of the present disclosure.

FIG. 18 is a flowchart illustrating a position estimation method for store management by a server according to the fourth embodiment of the present disclosure.

Referring to FIG. 18, the server receives sensor information of the tag from an AP in operation 1801. Height information of the tag may be identified from the sensor information of the tag. The height information of the tag may be identified from barometric pressure sensor information of a barometric pressure sensor attached to the tag.

The server receives direction angle information of the tag from the AP in operation 1803. The direction angle information of the tag includes at least one of angle information between the tag and the AP obtained using AoA.

The server receives distance information to the tag from the AP in operation 1805.

The server analyzes position information of the tag or a user's intention based on the received sensor information, direction angle information, and distance information in operation 1807. Additionally, the server analyzes the position information of the tag or the user's intention based on the number of times the tag moves. The server stores an analysis result in a database in operation 1809.

The server receives a product information request from a digital signage in operation 1811. The server then transmits product information reflecting the user's intention to the digital signage in operation 1813.

Orders of operations 1801, 1803, and 1805 of FIG. 18 are interchangeable with each other.

Figure 19:
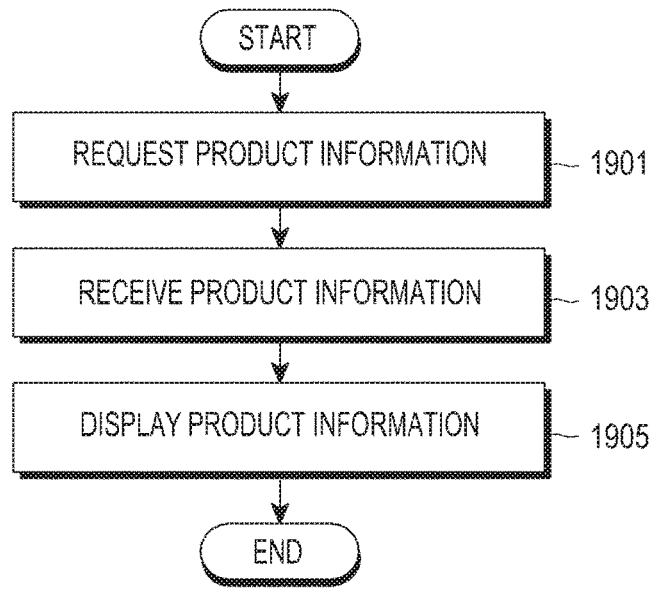
FIG. 19 is a flowchart illustrating a position estimation method for store management by a digital signage according to the fourth embodiment of the present disclosure.

FIG. 19 is a flowchart illustrating a position estimation method for store management by a digital signage according to the fourth embodiment of the present disclosure.

Referring to FIG. 19, the digital signage transmits a request for product information reflecting a user's intention to a server in operation 1901.

The digital signage receives the product information reflecting the user's intention from the server in operation 1903. The user's intention may be determined based on sensor information, direction angle information, distance information, the number of times the tag moves, and so forth.

The digital signage displays the received product information in operation 1905.

Figure 20:
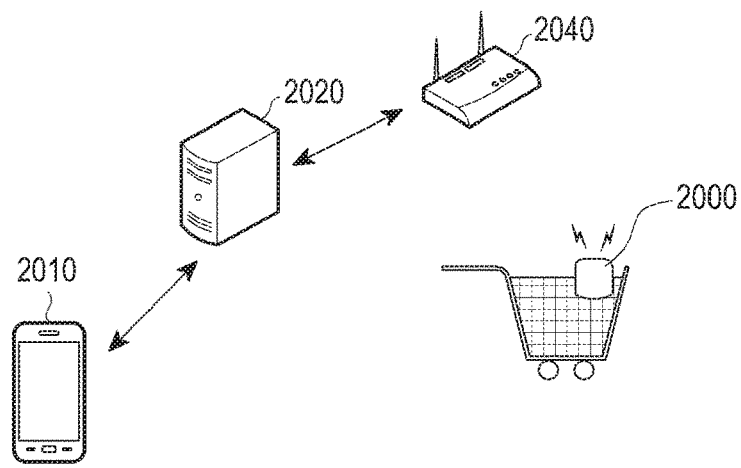
FIG. 20 is a diagram illustrating a position estimation method for mart management according to a fifth embodiment of the present disclosure.

FIG. 20 is a diagram illustrating a position estimation method for mart management according to a fifth embodiment of the present disclosure.

Referring to FIG. 20, a tag or sensor 2000 indicates a tag or sensor attached to a cart in a mart.

An AP 2040 may include a position estimator, identifies height information of the AP and direction angle information of the tag, and receives height information of the tag from the tag. The AP 2040 transmits the height information of the AP, the direction angle information of the tag, and the height information of the tag to a server 2020.

The server 2020 is connected with a digital device 2010, and analyzes a user's purchase pattern based on movement flow information of the tag and transmits an analysis result to the digital device 2010.

The digital device 2010 receives the purchase pattern analysis result from the server 2020 and displays the received purchase pattern analysis result.

According to the fourth embodiment of the present disclosure, a position of the tag (user), a user's shopping time, and user-purchased product information may be accurately detected.

Figure 21:
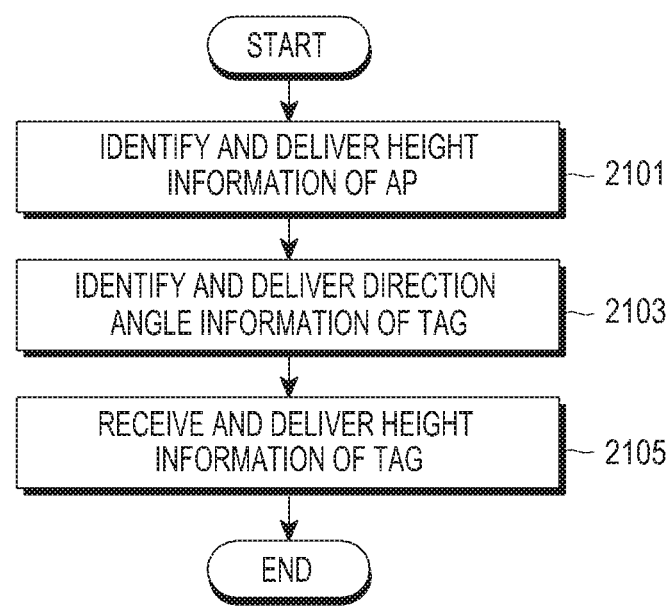
FIG. 21 is a flowchart illustrating a position estimation method for mart management by an AP according to the fifth embodiment of the present disclosure.

FIG. 21 is a flowchart illustrating a position estimation method for mart management by an AP according to the fifth embodiment of the present disclosure.

Referring to FIG. 21, the AP identifies height information of the AP and transmits the identified height information of the AP to a server in operation 2101.

The AP identifies direction angle information of a tag attached inside or outside a cart, and delivers the identified direction angle information of the tag to the server in operation 2103. The direction angle information of the tag includes at least one of angle information between the tag and the AP obtained using AoA.

The AP receives height information of the tag from the tag and delivers the received height information of the tag to the server in operation 2105. The height information of the tag may be identified from sensor information of the tag. More specifically, the height information of the tag may be identified from barometric pressure sensor information of a barometric pressure sensor attached to the tag.

Orders of operations 2101, 2103, and 2105 of FIG. 21 are interchangeable with each other.

Figure 22:
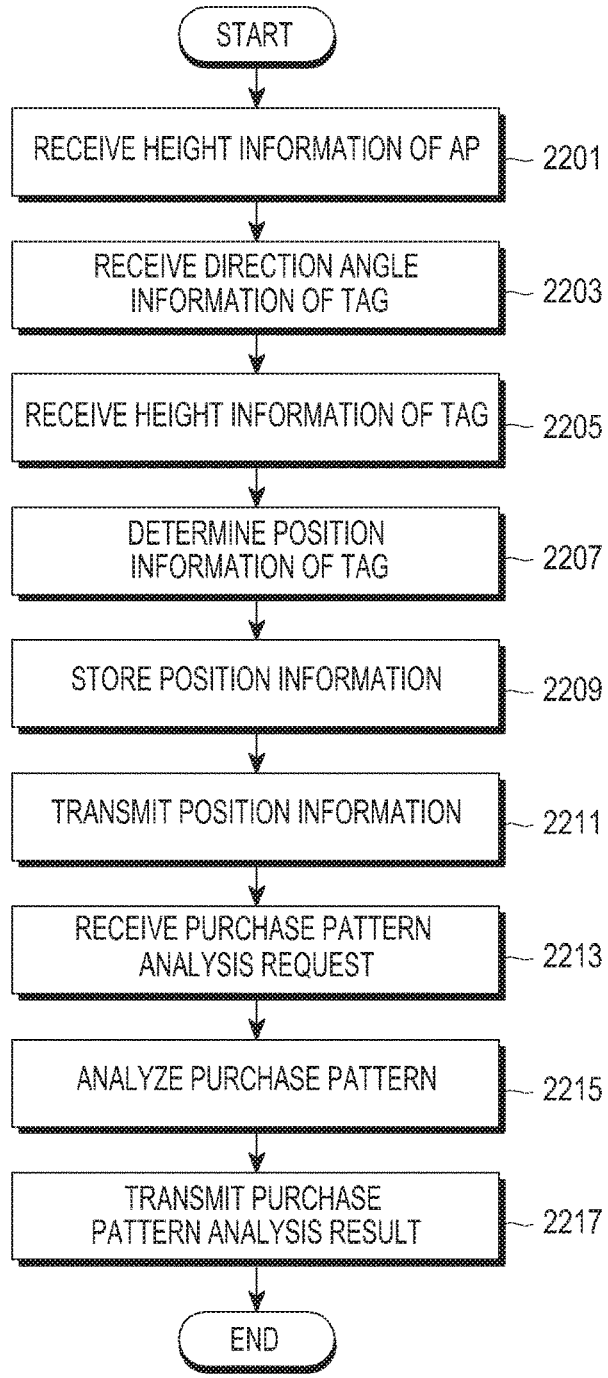
FIG. 22 is a flowchart illustrating a position estimation method for mart management by a server according to the fifth embodiment of the present disclosure.

FIG. 22 is a flowchart illustrating a position estimation method for mart management by a server according to the fifth embodiment of the present disclosure.

Referring to FIG. 22, the server receives height information of an AP from the AP in operation 2201. Height information of a tag may be identified from sensor information of the tag. The height information of the tag may be identified from barometric pressure sensor information of a barometric pressure sensor attached to the tag.

The server receives direction angle information of the tag from the AP in operation 2203. The direction angle information of the tag includes at least one of angle information between the tag and the AP obtained using AoA.

The server receives height information of the tag from the AP in operation 2205.

The server determines position information of the tag based on the height information of the AP, the direction angle information of the tag, and the height information of the tag in operation 2207. The server stores the position information of the tag in operation 2209. The server transmits the position information of the tag to a digital device connected with the server in operation 2211. Upon receiving a purchase pattern analysis request from the digital device in operation 2213, the server analyzes a purchase pattern in operation 2215. The purchase pattern may be determined based on movement flow information of the tag. The server transmits a purchase pattern analysis result to the digital device in operation 2217.

Orders of operations 2201, 2203, and 2205 of FIG. 22 are interchangeable with each other.

Figure 23:
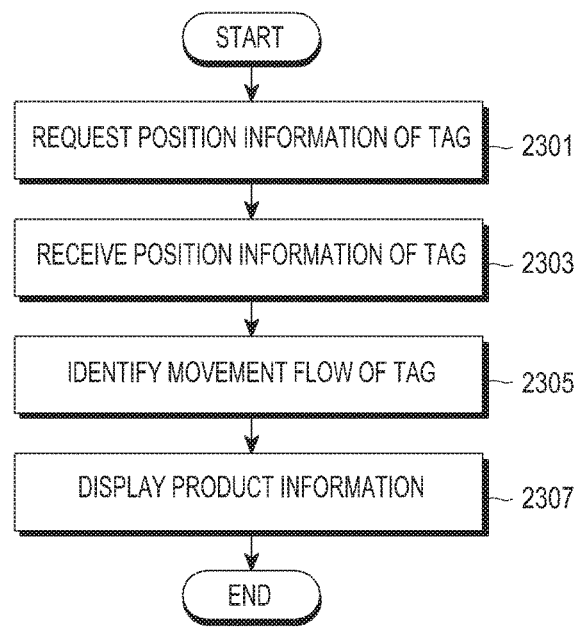
FIG. 23 is a flowchart illustrating a position estimation method for mart management by a digital device connected with a server according to the fifth embodiment of the present disclosure.

FIG. 23 is a flowchart illustrating a position estimation method for mart management by a digital device connected with a server according to the fifth embodiment of the present disclosure.

Referring to FIG. 23, the digital device connected with the server transmits a request for position information of a tag or a user's purchase pattern in operation 2301.

The digital device receives the position information of the tag from the server in operation 2303. The digital device also receives a purchase pattern analysis result as well as the position information of the tag from the server.

The digital device identifies a movement flow of the tag based on the position information of the tag or the purchase pattern analysis result in operation 2305. The digital device then displays product information in operation 2307.

Figure 24:
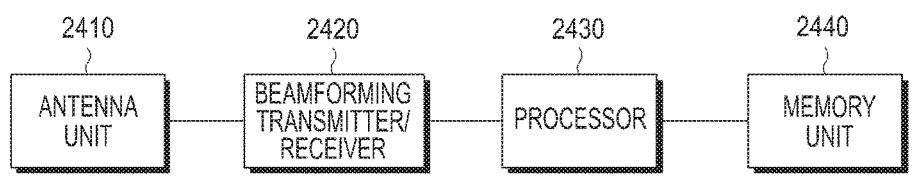
FIG. 24 is a block diagram of an AP according to an embodiment of the present disclosure.

FIG. 24 is a block diagram of an AP according to an embodiment of the present disclosure.

Referring to FIG. 24, the AP may include an antenna unit 2410, a beamforming transmitter/receiver 2420, a processor 2430, and a memory unit 2440.

The antenna unit 2410 includes multiple antenna arrays and transmits and receives a signal. For example, the antenna unit 2410 may transmit and receive a signal in a band of 60 GHz by using an mmWave technique. The beamforming transmitter/receiver 2420 forms one or more beams and performs processing for signal transmission and reception through the formed beams. For example, the beamforming transmitter/receiver 2420 may include an encoder (not shown), a modulator (not shown), a demultiplexer (not shown), a beamformer (not shown), a beamforming vector former (not shown), an orthogonal frequency division multiplexing (OFDM) modulator (not shown), and a radio frequency (RF) processor (not shown).

The processor 2430 controls overall operations of the AP. More particularly, the processor 2430 according to embodiments of the present disclosure identifies height information of the AP upon occurrence of an event for estimating a position of a terminal. The processor 2430 also identifies angle information between the terminal and the AP by using AoA.

The processor 2430 transmits a request for height information of the terminal to the terminal and receives the height information of the terminal from the terminal. The processor 2430 may identify the height information of the terminal by receiving barometric pressure sensor information from the terminal. The barometric pressure sensor information may include a vertical movement amount (or an altitude value) of the terminal.

Once identifying the height information of the AP, the height information of the terminal, and direction angle φ information, the processor 2430 may identify a position of X coordinates and Y coordinates and thus may estimate and correct position information of the terminal. Herein, a positioning distance between the AP and the position of the X coordinates and the Y coordinates is defined as D1, and a distance between an actual position 440 of the terminal and the position 430 of the X coordinates and the Y coordinates as D3.

The processor 2430 estimates and corrects the positioning error D2 by subtracting D3 from D1. The memory unit 2440 stores a program for processing and control by the processor 2430 and performs functions for temporarily storing input/output data.

Figure 25:
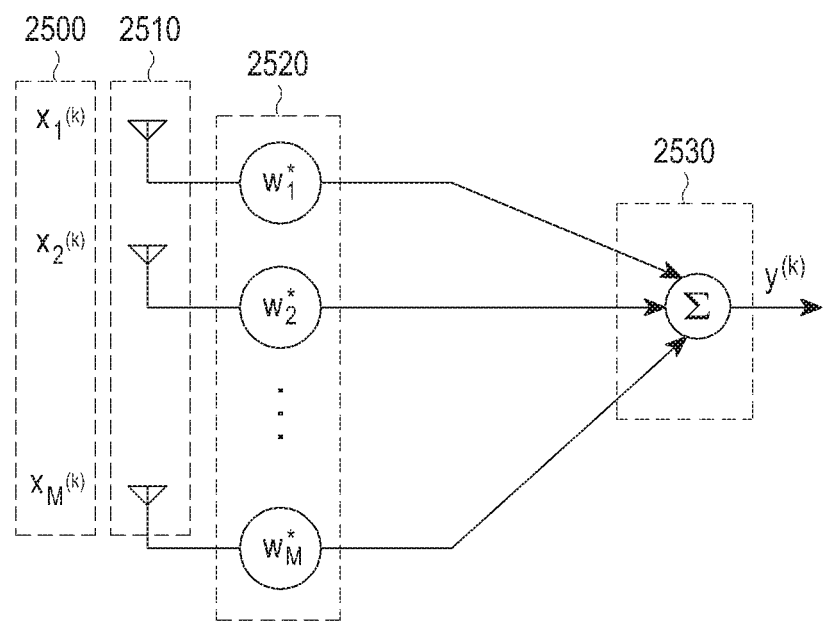
FIG. 25 is a block diagram of an antenna unit and a beamforming transmitter/receiver according to an embodiment of the present disclosure.

FIG. 25 is a block diagram of an antenna unit and a beamforming transmitter/receiver according to an embodiment of the present disclosure.

Referring to FIG. 25, an antenna unit 2510 includes M array antennas and is in charge of signal transmission and reception. For example, the antenna unit 2510 may transmit and receive a signal in the band of 60 GHz by using the mmWave technique.

A beamforming transmitter/receiver forms one or more beams. The beamforming transmitter/receiver multiplies M weight values 2520 by signals 2500 received through the formed beams, and sums the multiplication results as in 2530. The summation result is delivered to a processor.

Figure 26:
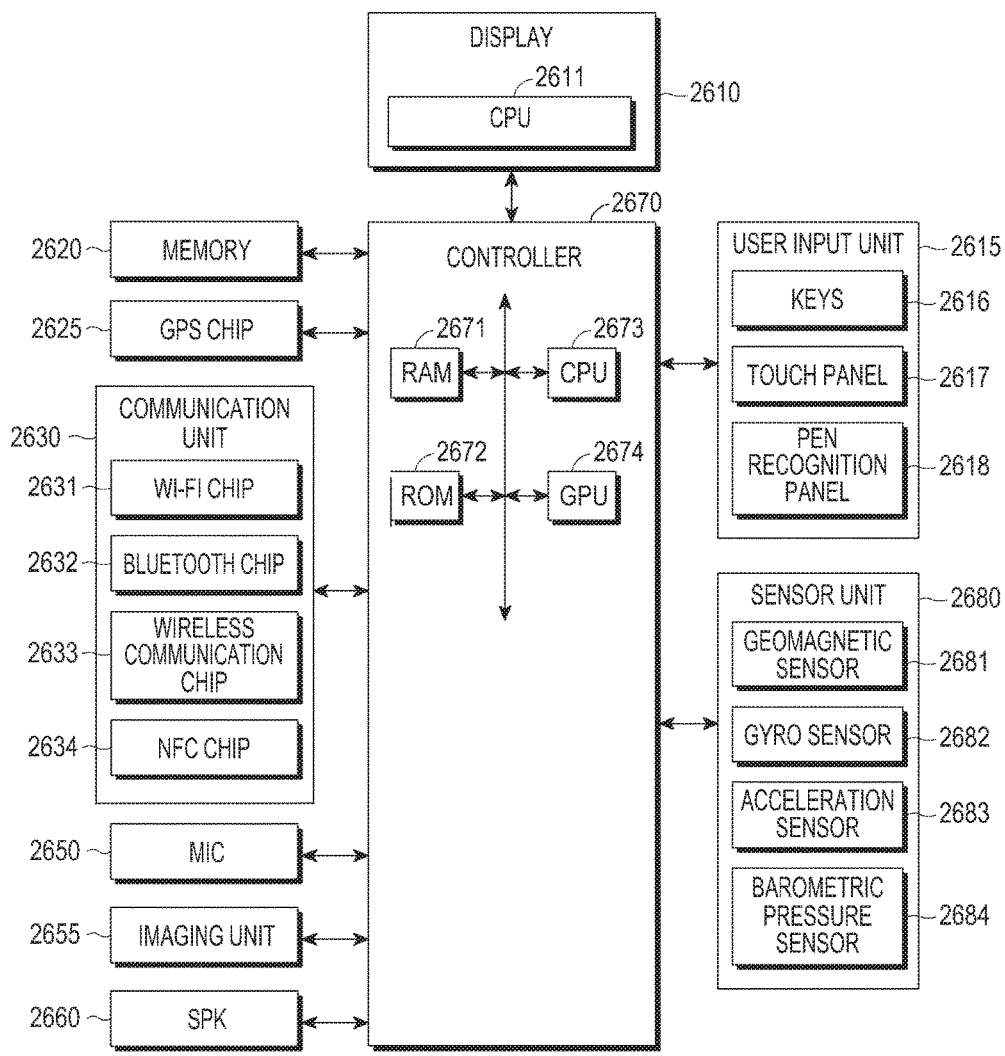
FIG. 26 is a block diagram of a terminal according to an embodiment of the present disclosure.

FIG. 26 is a block diagram of a terminal according to an embodiment of the present disclosure.

Referring to FIG. 26, the terminal may include a controller 2670, a communication unit 2630, a memory 2620, a global positioning system (GPS) chip 2625, a microphone (MIC) 2650, an imaging unit 2655, a speaker (SPK) 2660, a display 2610, a user input unit 2615, and a sensor unit 2680.

The controller 2670 includes a graphics processing unit (GPU) 2674, a central processing unit (CPU) 2673, a read only memory (ROM) 2672, and a random access memory (RAM) 2671 that stores signals or data input from outside the terminal or is used as a memory region for tasks performed by the terminal, and also controls other elements of the terminal.

The communication unit 2630 transmits and receives information with an external device using various wireless/wired communication schemes, and may include at least one of a Wi-Fi chip 2631, a BT chip 2632, a wireless communication chip 2633, and an NFC chip 2634.

The memory 2620 stores programs for executing operations of the terminal and data corresponding to execution of the operations.

The user input unit 2615 is used for an interface between a device and a user, and may include keys 2616, a touch panel 2617, and a pen recognition panel 2618. If the keys 2616, the touch panel 2617, and the pen recognition panel 2618 are pressed, a control command is generated and delivered to the controller 2670, and the controller 2670 controls an operation of the terminal according to the control command.

The GPS chip 2625 receives electric waves from a plurality of GPS satellites (not shown) on the orbit, and calculates a position of the terminal by using a time of arrival from the GPS satellites to the terminal and GPS parameters.

The terminal may further include the MIC 2650, the imaging unit 2655, and the SPK 2660.

The MIC 2650 receives voice or sound to generate an electric signal under control of the controller 2670.

The imaging unit 2655 performs an imaging operation according to user's manipulation.

The SPK 2660 outputs sound corresponding to various signals (e.g., a radio signal, a broadcast signal, a digital audio file, a digital video file, or photographing) to outside of the display 2610 under control of the controller 2670.

The sensor unit 2680 detects at least one physical quantity in a preset range. For example, the sensor unit 2680 may include at least one of a camera for capturing an image, an acceleration sensor for detecting an acceleration corresponding to a force applied to a moving object or a gravity acceleration of a stationary object, a geomagnetic sensor 2681 for detecting a flow of an electromagnetic field to detect an orientation, a gyro sensor 2682 used to detect a rotation speed for detection of motion, an infrared (IR) sensor (not shown) for detecting an infrared ray emitted from an object, an acceleration sensor 2683 for detecting an acceleration corresponding to a force applied to a moving object or a gravity acceleration of a stationary object, and a barometric pressure sensor 2684 for detecting an applied barometric pressure. An embodiment including the above sensors has already been described above.

The display 2610 may include a touch screen that displays information of various applications (e.g., a call, data transmission, broadcasting, a camera, and so forth) executable by the controller 2670 and provides a user interface configured correspondingly. The controller 2670 causes a soft key displayed on the touch screen to be selected in response to a user gesture detected on the touch screen, or performs an application or function corresponding to the soft key. The user gesture includes a touch by a finger or a tool, recognition of motion of a human body.

Figure 27:
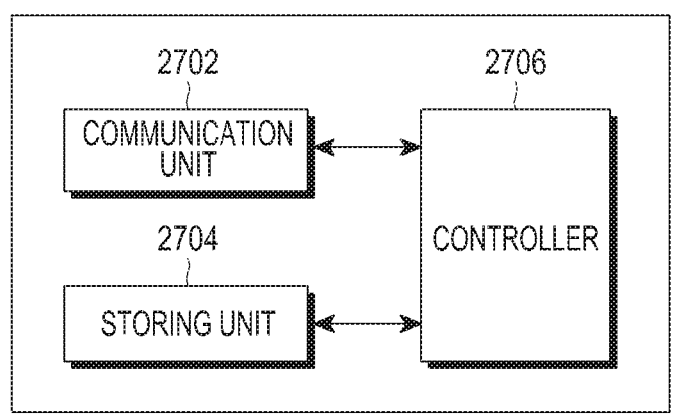
FIG. 27 is a block diagram of a server according to an embodiment of the present disclosure.

FIG. 27 is a block diagram of a server according to an embodiment of the present disclosure.

Referring to FIG. 27, the server may include a communication unit 2702, a storing unit 2704, and a controller 2706.

The communication unit 2702 may include a transmission module and a reception module for transmitting data to and receiving data from an AP, a digital device, or a digital signage according to an embodiment of the present disclosure.

The controller 2706 provides information requested by the terminal, the digital signage, or the AP and stores various types of data.

The controller 2670 performs the same operation as estimation and correction of position information of the terminal performed in a controller of the AP (that is, operations of FIGS. 8 and 9). According to another embodiment of the present disclosure, the controller 2706 analyzes a user's intention based on sensor information, direction angle information, and distance information as shown in FIG. 16. In another embodiment of the present disclosure, the controller 2706 determines position information of a tag based on height information of the AP, direction angle information of the tag, and position (height) information of the tag, and analyzes a purchase pattern based on the position information of the tag, as shown in FIG. 20.

The storing unit 2704 stores a program for processing and controlling the controller 2706 and performs functions for temporarily storing input/output data.

As is apparent from the foregoing description, the present disclosure may minimize an installation cost in estimation a position or direction of the terminal.

Moreover, real-time positioning is possible in estimation of the position or direction of the terminal.

Furthermore, the position or direction of the terminal may be accurately estimated.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Therefore, embodiments of the present disclosure include a program including codes for implementing an apparatus or method claimed in an arbitrary claim and a machine (computer)-readable storage medium for storing such a program. The program may be electronically transferred through an arbitrary medium, such as a communication signal delivered through a wired or wireless connection, and the present disclosure properly includes equivalents thereof.

The apparatus for estimating a position of a terminal according to an embodiment of the present disclosure may receive and store the program from a program providing device connected in a wired or wireless manner. The program providing device may include a memory for storing a program including instructions for instructing the program processing device to execute a preset method for estimating a position of a terminal, information necessary for a data scheduling method, a communication unit for performing wired or wireless communication with the program processing device, and a controller for transmitting a corresponding program to a transceiving apparatus at the request of the program processing device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for estimating a position of a terminal, the method comprising:
   receiving, by the terminal from an access point (AP), a request to transmit a beacon signal;
   receiving, by the terminal from the AP, height information of the AP and angle information between the terminal and the AP;
   extracting, by the terminal, information about a barometric pressure sensor of the terminal in response to the request; and transmitting, by the terminal to the AP, the beacon signal and the information about the barometric pressure sensor, wherein the information about the barometric pressure sensor comprises height information of the terminal, and wherein a position of the terminal from a reference point of the AP at which the AP has a height of 0 is estimated using a proportionality among the height information of the AP, the height information of the terminal, and a positioning distance, and wherein the positioning distance is estimated based on the height information of the AP, the height information of the terminal, and the angle information between the terminal and the AP.

2. An apparatus for estimating a position of a terminal, the apparatus comprising:

a receiver configured to:
 receive from an access point (AP) a request to transmit a beacon signal, and
 receive from an AP, height information of the AP and angle information between the terminal and the AP;

at least one processor configured to extract information about a barometric pressure sensor of the terminal in response to the request; and a transmitter configured to transmit to the AP the beacon signal and the information about the barometric pressure sensor, wherein the information about the barometric pressure sensor comprises height information of the terminal, and wherein a position of the terminal from a reference point of the AP at which the AP has a height of 0 is estimated using a proportionality among the height information of the AP, the height information of the terminal, and a positioning distance, and wherein the positioning distance is estimated based on the height information of the AP, the height information of the terminal, and the angle information between the terminal and the AP.

3. The method of claim 1, wherein the height information of the terminal is generated based on at least one of a gyro sensor, an acceleration sensor, a tilt sensor, a piezo sensor, or the barometric pressure sensor of the terminal.

4. The apparatus of claim 2, wherein the height information of the terminal is generated based on at least one of a gyro sensor, an acceleration sensor, a tilt sensor, a piezo sensor, or the barometric pressure sensor of the terminal.

* * * * *